US012691842B2

(12) United States Patent  (10) Patent No.:  US 12,691,842 B2

Mazumder  (45) Date of Patent:  *Jul. 28, 2026

(54) SYSTEMS AND METHODS FOR DETECTING VEHICLE COLLISIONS

(71) Applicant: Geotab Inc., Oakville (CA)

(72) Inventor: Joy Mazumder, Etobicoke (CA)

(73) Assignee: Geotab Inc., Oakville (CA)

( * ) Notice: Subject to any disclaimer, the term of this patent is extended or adjusted under 35 U.S.C. 154(b) by 24 days.

This patent is subject to a terminal disclaimer.

(21) Appl. No.: 18/659,565

(22) Filed: May 9, 2024

(65) Prior Publication Data

US 2025/0346203 A1   Nov. 13, 2025

(51) Int. Cl.
| | |
|---|---|
| *B60R 21/013* | (2006.01) |
| *B60W 50/14* | (2020.01) |
| *G06T 7/20* | (2017.01) |
| *G06V 20/58* | (2022.01) |
| *H04W 4/46* | (2018.01) |

(52) U.S. Cl.
CPC ........... *B60R 21/013* (2013.01); *B60W 50/14* (2013.01); *G06T 7/20* (2013.01); *G06V 20/58* (2022.01); *H04W 4/46* (2018.02)

(58) Field of Classification Search
CPC ........ B60R 21/013; B60W 50/14; G06T 7/20; G06V 20/58; H04W 4/46
See application file for complete search history.

(56) References Cited

U.S. PATENT DOCUMENTS

| | | | |
|---|---|---|---|
| 6,285,778 B1 * | 9/2001 | Nakajima | ............ G06V 10/145 |
| | | | 382/104 |
| 7,505,841 B2 | 3/2009 | Sun et al. | |
| 7,676,087 B2 | 3/2010 | Dhua et al. | |
| 9,405,970 B2 | 8/2016 | Israel et al. | |
| 9,489,635 B1 | 11/2016 | Zhu | |
| 10,007,269 B1 | 6/2018 | Gray | |
| 10,496,891 B2 | 12/2019 | Sai | |
| 10,728,420 B2 | 7/2020 | Popa | |
| 10,814,815 B1 * | 10/2020 | Rishi | ..................... B60R 21/013 |
| 10,997,434 B2 | 5/2021 | Kurian et al. | |
| 11,336,867 B2 | 5/2022 | Meier et al. | |
| 11,758,096 B2 | 9/2023 | Shah et al. | |
| 11,866,055 B1 | 1/2024 | Srinivasan et al. | |

(Continued)

OTHER PUBLICATIONS

International Search Report and Written Opinion for International Application No. PCT/CA2025/050631, mailed Jun. 25, 2025, 10 pages.

(Continued)

*Primary Examiner* — Brian A Zimmerman
*Assistant Examiner* — Cal J Eustaquio
(74) *Attorney, Agent, or Firm* — Mark J. Pringle-Rigby

(57) ABSTRACT

Systems, methods, models, and training for collision detection and near miss detection are discussed. Models are trained to identify collisions and near misses between two vehicles, based on how quickly a bounding box size changes for a vehicle represented in image data. Rapidly changing bounding box size is indicative of extreme proximity between vehicles, and thus indicative of collision or near-miss scenarios. Identifications of collisions or near misses can be reported to a remote operator, to send emergency assistance, perform driver evaluation, or alert other drivers in the area of risks.

21 Claims, 12 Drawing Sheets

(56)           References Cited

U.S. PATENT DOCUMENTS

| | | | |
|---|---|---|---|
| 11,955,001 B2 | 4/2024 | D'Andre | |
| 11,995,546 B1 | 5/2024 | Srinivasan et al. | |
| 12,322,162 B1* | 6/2025 | Mazumder | G06V 10/764 |
| 2016/0343145 A1 | 11/2016 | Israel et al. | |
| 2016/0375904 A1 | 12/2016 | Satzoda et al. | |
| 2017/0011280 A1 | 1/2017 | Soldevila et al. | |
| 2018/0373263 A1 | 12/2018 | Gray | |
| 2019/0103026 A1 | 4/2019 | Liu et al. | |
| 2019/0205667 A1 | 7/2019 | Avidan et al. | |
| 2019/0213429 A1* | 7/2019 | Sicconi | G06V 40/18 |
| 2020/0094824 A1 | 3/2020 | Schulter et al. | |
| 2020/0349365 A1 | 11/2020 | Behrendt | |
| 2021/0090180 A1 | 3/2021 | Navarrete et al. | |
| 2021/0197824 A1* | 7/2021 | Kim | B60W 30/0956 |
| 2021/0326654 A1 | 10/2021 | Yoon et al. | |
| 2021/0370921 A1 | 12/2021 | Silva et al. | |
| 2021/0403050 A1* | 12/2021 | Gan | B60W 60/0027 |
| 2022/0198930 A1 | 6/2022 | Ookuma | |
| 2022/0204038 A1 | 6/2022 | Seo et al. | |
| 2022/0245955 A1 | 8/2022 | Freeman et al. | |
| 2022/0301099 A1 | 9/2022 | Cebron et al. | |
| 2022/0309593 A1 | 9/2022 | Lee et al. | |
| 2022/0374737 A1 | 11/2022 | Dhara et al. | |
| 2023/0038842 A1 | 2/2023 | Yu et al. | |
| 2023/0098483 A1 | 3/2023 | D'Andre | |
| 2023/0206596 A1 | 6/2023 | Yamamoto | |
| 2023/0230484 A1 | 7/2023 | Al Faruque et al. | |
| 2023/0281966 A1 | 9/2023 | Vecerik et al. | |
| 2024/0005675 A1 | 1/2024 | Lelowicz et al. | |
| 2024/0010226 A1 | 1/2024 | Hemantharaja | |
| 2024/0161501 A1 | 5/2024 | Latapie et al. | |
| 2025/0171051 A1* | 5/2025 | Li | B60W 60/0015 |

OTHER PUBLICATIONS

Extended European Search Report for European Application No. 25172418.3, mailed Sep. 11, 2025, 10 pages.
Li Changlin et al: "TTC4MCP: Monocular Collision Prediction Based onSelf-Supervised TTC Estimation",2023 IEEE/RSJ International Conference Onintelligent Robots and Systems (IROS),IEEE,Oct. 2023 (Oct. 2023), pp. 244-250.
Taccari Leonardo et al: "Classification of Crash and Near-Crash Events from Dashcam Videos and Telematics", 2018 21st International Conference on Intelligent Transportation Systems (ITSC), Nov. 2018 (Nov. 2018), pp. 2460-2465.

* cited by examiner

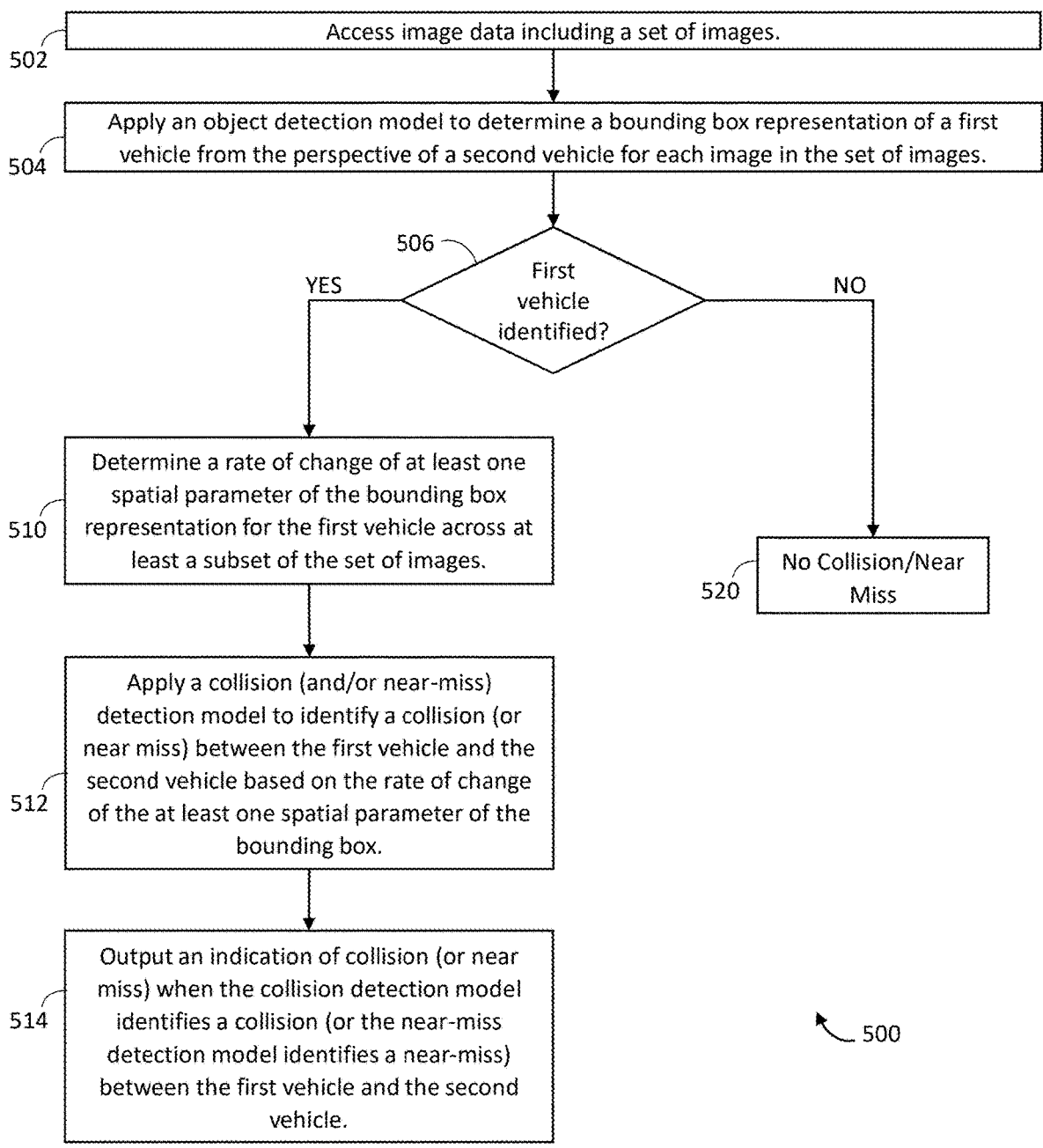

502 — Access image data including a set of images.

504 — Apply an object detection model to determine a bounding box representation of a first vehicle from the perspective of a second vehicle for each image in the set of images.

506 — First vehicle identified?

YES

NO

510 — Determine a rate of change of at least one spatial parameter of the bounding box representation for the first vehicle across at least a subset of the set of images.

520 — No Collision/Near Miss

512 — Apply a collision (and/or near-miss) detection model to identify a collision (or near miss) between the first vehicle and the second vehicle based on the rate of change of the at least one spatial parameter of the bounding box.

514 — Output an indication of collision (or near miss) when the collision detection model identifies a collision (or the near-miss detection model identifies a near-miss) between the first vehicle and the second vehicle.

| Frame # | Time (s) | Spatial Parameter (pixels) | Spatial Parameter Difference |
|---|---|---|---|
| 0 | 0 | 80 | - |
| 1 | 0.0625 | 90 | 10 |
| 2 | 0.125 | 101 | 11 |
| 3 | 0.1875 | 130 | 29 |
| 4 | 0.25 | 170 | 40 |
| 5 | 0.3125 | 210 | 40 |
| 6 | 0.375 | 260 | 50 |
| 7 | 0.4375 | 330 | 70 |
| 8 | 0.5 | 400 | 70 |
| 9 | 0.5625 | 480 | 80 |
| 10 | 0.625 | 570 | 90 |
| 11 | 0.6875 | 670 | 100 |
| 12 | 0.75 | 740 | 70 |
| 13 | 0.8125 | 740 | 0 |
| 14 | 0.875 | 740 | 0 |
| 15 | 0.9375 | 740 | 0 |
| 16 | 1 | 740 | 0 |

SYSTEMS AND METHODS FOR DETECTING VEHICLE COLLISIONS

TECHNICAL FIELD

The present disclosure generally relates to systems and methods for detecting vehicle positioning, and in particular relates to detecting vehicle collision or near-miss situations.

BACKGROUND

Monitoring vehicle movement and positioning is advantageous for fleet managers for a variety of reasons, including improving the safety of their fleet. Via real time monitoring, inappropriate behavior or dangerous situations can be identified, and a driver can be immediately alerted of the dangerous situation. If a critical incident occurs (such as a collision), emergency response teams can be immediately alerted and mobilized to provide aid. Reports can be prepared indicating or summarizing dangerous situations. Such alerts or reports may reduce occurrence of traffic accidents. If a critical incident occurs (such as a collision), emergency response teams can be immediately alerted and mobilized to provide aid.

SUMMARY

According to a broad aspect, the present disclosure describes a method for training a machine-learning model, the method comprising: accessing a library of training image data, the library of training image data including sets of images representing respective time periods, at least a plurality of sets of images of the library including respective representations of a respective first vehicle from a perspective of a respective second vehicle over a respective time period, and each set of images in the plurality of sets of images associated with a collision label indicating whether the respective first vehicle and the respective second vehicle collide in the respective time period; for each set of images in the plurality of sets of images: applying, by at least one processor, an object detection model to each image in the set of images to determine a respective bounding box representation of the respective first vehicle for each image in the set of images; determining, by the at least one processor, a rate of change of at least one spatial parameter of the bounding box representation for the respective first vehicle across at least a subset of images of the set of images; determining a confidence of collision indicator for the set of images by applying, by the at least one processor, a collision detection model to the rate of change of the at least one spatial parameter; and evaluating a collision loss function, the collision loss function including a difference between an indication of collision in a respective collision label for the set of images and the determined confidence of collision indicator; and training the collision detection model by adjusting model parameters to minimize the collision loss function over the plurality of sets of images.

Each set of images in the plurality of sets of images may be further associated with a near-miss label indicating whether the respective first vehicle and the respective second vehicle had a near-miss in the respective time period; and the method may further comprise: for each set of images in the plurality of sets of images: determining a confidence of near-miss indicator for the set of images by applying, by the at least one processor, a near-miss detection model to the rate of change of the at least one spatial parameter; and evaluating a near-miss loss function, the near-miss loss function including a difference between an indication of near-miss in a respective near-miss label for the set of images and the determined confidence of near-miss indicator; and training the near-miss detection model by adjusting model parameters to minimize the near-miss loss function over the plurality of sets of images.

Each set of images in the plurality of sets of images may be further associated with a near-miss label indicating whether the respective first vehicle and the respective second vehicle had a near-miss in the respective time period; the collision detection model may be a combined collision and near-miss detection model; and for each set of images: determining the confidence of collision indicator for the set of images by applying the collision detection model may further comprise determining a confidence of near-miss indicator for the set of images by applying the combined collision and near-miss detection model to the rate of change of the at least one spatial parameter; and evaluating the collision loss function may comprise evaluating a combined collision and near-miss loss function, the combined collision and near-miss loss function including: a difference between an indication of collision in a respective collision label for the set of images and the determined confidence of collision indicator, and a difference between an indication of near-miss in a respective near-miss label for the set of images and the determined confidence of near-miss indicator; and training the collision detection model may comprise training the combined collision and near-miss detection model by adjusting model parameters to minimize the collision and near-miss loss function over the plurality of sets of images.

The plurality of sets of images may include only sets of images where the respective first and second vehicle are positioned in a respective common lane of travel.

The method may further comprise for each set of images in the library of training image data: determining whether the set of images includes a representation of the respective first vehicle from the perspective of the respective second vehicle, where the respective first vehicle and the respective second vehicle are positioned in a respective common lane of travel; if the set of images includes the representation of the respective first vehicle from the position of the respective second vehicle, with the respective first vehicle and the respective second vehicle positioned in the respective common lane of travel: including the set of images in the plurality of sets of images; and if the set of images does not include the representation of the respective first vehicle from the position of the respective second vehicle, or the respective first vehicle and the respective second vehicle are not positioned in the respective common lane of travel: excluding the set of images from the plurality of sets of images.

The method may further comprise determining whether auxiliary criteria are satisfied over each set of images in the plurality of sets of images; and further evaluating the collision loss function for at least one set of images in the plurality of sets of images, if the auxiliary criteria are not satisfied. The auxiliary criteria may require that the collision loss function be within a maximum loss threshold for each set of images in the plurality of sets of images. The auxiliary criteria may require that the collision loss function be within a maximum loss threshold for a defined quantity of sets of images in the plurality of sets of images, where the defined quantity of sets of images is smaller than a total quantity of sets of images in the plurality of sets of images. The auxiliary criteria may require that the collision loss function be evaluated for each set of images in the plurality of sets of images. The auxiliary criteria may require that the collision loss function be evaluated for a defined quantity of sets of images in the plurality of sets of images, where the defined quantity of sets of images is smaller than a total quantity of sets of images in the plurality of sets of images.

According to another broad aspect, the present disclosure describes a system for training a machine-learning model, the system comprising: at least one processor; at least one non-transitory processor-readable storage medium storing processor-executable instructions which when executed cause the system to: access a library of training image data, the library of training image data including sets of images representing respective time periods, at least a plurality of sets of images of the library including respective representations of a respective first vehicle from a perspective of a respective second vehicle over a respective time period, and each set of images in the plurality of sets of images associated with a collision label indicating whether the respective first vehicle and the respective second vehicle collide in the respective time period; for each set of images in the plurality of sets of images: apply, by the at least one processor, an object detection model to each image in the set of images to determine a respective bounding box representation of the respective first vehicle for each image in the set of images; determine, by the at least one processor, a rate of change of at least one spatial parameter of the bounding box representation for the respective first vehicle across at least a subset of images of the set of images; determine a confidence of collision indicator for the set of images by applying, by the at least one processor, a collision detection model to the rate of change of the at least one spatial parameter; and evaluate a collision loss function, the collision loss function including a difference between an indication of collision in a respective collision label for the set of images and the determined confidence of collision indicator; and train the collision detection model by adjusting model parameters to minimize the collision loss function over the plurality of sets of images.

Each set of images in the plurality of sets of images may be further associated with a near-miss label indicating whether the respective first vehicle and the respective second vehicle had a near-miss in the respective time period; and the processor-executable instructions may further cause the system to: for each set of images in the plurality of sets of images: determine a confidence of near-miss indicator for the set of images by applying, by the at least one processor, a near-miss detection model to the rate of change of the at least one spatial parameter; and evaluate a near-miss loss function, the near-miss loss function including a difference between an indication of near-miss in a respective near-miss label for the set of images and the determined confidence of near-miss indicator; and train the near-miss detection model by adjusting model parameters to minimize the near-miss loss function over the plurality of sets of images.

Each set of images in the plurality of sets of images may be further associated with a near-miss label indicating whether the respective first vehicle and the respective second vehicle had a near-miss in the respective time period; the collision detection model may be a combined collision and near-miss detection model; and for each set of images: the processor executable instructions which cause the system to determine the confidence of collision indicator for the set of images by applying the collision detection model may further cause the system to determine a confidence of near-miss indicator for the set of images by applying the combined collision and near-miss detection model to the rate of change of the at least one spatial parameter; and the processor executable instructions which cause the system to evaluate the collision loss function may cause the system to evaluate a combined collision and near-miss loss function, the combined collision and near-miss loss function including: a difference between an indication of collision in a respective collision label for the set of images and the determined confidence of collision indicator, and a difference between an indication of near-miss in a respective near-miss label for the set of images and the determined confidence of near-miss indicator; and training the collision detection model may comprise training the combined collision and near-miss detection model by adjusting model parameters to minimize the combined collision and near-miss loss function over the plurality of sets of images.

The plurality of sets of images may include only sets of images where the respective first and second vehicle are positioned in a respective common lane of travel.

The processor executable instructions may further cause the system to, for each set of images in the library of training image data: determine whether the set of images includes a representation of the respective first vehicle from the perspective of the respective second vehicle, where the respective first vehicle and the respective second vehicle are positioned in a respective common lane of travel; if the set of images includes the representation of the respective first vehicle from the position of the respective second vehicle, with the respective first vehicle and the respective second vehicle positioned in the respective common lane of travel: include the set of images in the plurality of sets of images; and if the set of images does not include the representation of the respective first vehicle from the position of the respective second vehicle, or the respective first vehicle and the respective second vehicle are not positioned in the respective common lane of travel: exclude the set of images from the plurality of sets of images.

The processor executable instructions may further cause the system to: determine whether auxiliary criteria are satisfied over each set of images in the plurality of sets of images; and further evaluate the collision loss function for at least one set of images in the plurality of sets of images, if the auxiliary criteria are not satisfied. The auxiliary criteria may require that the collision loss function be within a maximum loss threshold for each set of images in the plurality of sets of images. The auxiliary criteria may require that the collision loss function be within a maximum loss threshold for a defined quantity of sets of images in the plurality of sets of images, where the defined quantity of sets of images is smaller than a total quantity of sets of images in the plurality of sets of images. The auxiliary criteria may require that the collision loss function be evaluated for each set of images in the plurality of sets of images. The auxiliary criteria may require that the collision loss function be evaluated for a defined quantity of sets of images in the plurality of sets of images, where the defined quantity of sets of images is smaller than a total quantity of sets of images in the plurality of sets of images.

According to yet another broad aspect, the present disclosure describes a method for identifying a collision between a first vehicle and second vehicle comprising: accessing image data, the image data including a set of images; applying, by at least one processor, an object detection model to each image in the set of images to determine a respective bounding box representation of the first vehicle from the perspective of the second vehicle for each image; determining, by the at least one processor, a rate of change of at least one spatial parameter of the bounding box for the first vehicle across at least a subset of the set of images; applying, by at least one processor, a collision detection model to identify a collision between the first vehicle and the second vehicle based on the rate of change of the at least one spatial parameter of the bounding box; and outputting an indication of collision when the collision detection model identifies a collision between the first vehicle and the second vehicle.

If applying the object detection model to each image in the set of images to determine a respective bounding box representation of the first vehicle from the perspective of the second vehicle for each image does not result in a determination of any bounding boxes: the method may identify no collision between the first vehicle and the second vehicle.

The method may further comprise: determining, by the at least one processor, for each image of the set of images, whether the first vehicle and the second vehicle are positioned in a respective common lane of travel; and if the first vehicle and the second vehicle are not positioned in a respective common lane of travel: determine no collision between the first vehicle and the second vehicle.

Accessing the image data may comprise capturing the image data by at least one image capture device positioned at the second vehicle.

Accessing the image data may comprise retrieving the image data stored at a non-transitory processor-readable storage medium.

The at least one processor may be positioned at the second vehicle, and outputting an indication of collision may comprise transmitting the indication of collision by a communication interface to be received by a device remote from the second vehicle. The method may further comprise outputting an alert to an operator of the device remote from the second vehicle. The method may further comprise transmitting, by a communication interface of the device remote from the second vehicle, the indication of collision to at least one other vehicle in a geographic region proximate a position of the second vehicle.

According to yet another broad aspect, the present disclosure describes a system for identifying a collision between a first vehicle and second vehicle comprising: at least one processor; at least one non-transitory processor-readable storage medium storing processor-executable instructions which when executed cause the system to: access image data, the image data including a set of images; apply, by the at least one processor, an object detection model to each image in the set of images to determine a respective bounding box representation of the first vehicle from the perspective of the second vehicle for each image; determine, by the at least one processor, a rate of change of at least one spatial parameter of the bounding box for the first vehicle across at least a subset of the set of images; apply, by at least one processor, a collision detection model to identify a collision between the first vehicle and the second vehicle based on the rate of change of the at least one spatial parameter of the bounding box; and output an indication of collision when the collision detection model identifies a collision between the first vehicle and the second vehicle.

If the processor-executable instructions which cause the system to apply the object detection model to each image in the set of images to determine a respective bounding box representation of the first vehicle from the perspective of the second vehicle for each image does not result in a determination of any bounding boxes: the processor-executable instructions may cause the system to identify no collision between the first vehicle and the second vehicle.

The processor-executable instructions may further cause the system to: determine, by the at least one processor, for each image of the set of images, whether the first vehicle and the second vehicle are positioned in a respective common lane of travel; and if the first vehicle and the second vehicle are not positioned in a respective common lane of travel: determine no collision between the first vehicle and the second vehicle.

The system may further comprise at least one image capture device positioned at the second vehicle, and the processor-executable instructions which cause the system to access the image data may cause the system to capture the image data by the at least one image capture device positioned at the second vehicle. The system may include a telematic device positioned at the second vehicle, and the at least one processor and the at least one non-transitory processor-readable storage medium are included in the telematic device.

The processor executable instructions which cause the system to access the image data may cause the system to retrieve the image data stored at the non-transitory processor-readable storage medium.

The system may further comprise a communication interface at the second vehicle, the at least one processor may be positioned at the second vehicle, and the processor-executable instructions which cause the system to output an indication of collision may cause the communication interface at the second vehicle to transmit the indication of collision to be received by a device remote from the second vehicle. The system may further comprise the device remote from the second vehicle, and the processor-executable instructions may further cause the system to output, by an output interface of the device remote from the second vehicle, an alert to an operator of the device remote from the second vehicle. The system may further comprise the device remote from the second vehicle, and the processor-executable instructions may further cause the system to transmit, by a communication interface of the device remote from the second vehicle, the indication of collision to at least one other vehicle in a geographic region proximate a position of the second vehicle.

According to yet another broad aspect, the present disclosure describes a method for training a machine-learning model, the method comprising: accessing a library of training image data, the library of training image data including sets of images representing respective time periods, at least a plurality of sets of images of the library including respective representations of a respective first vehicle from a perspective of a respective second vehicle over a respective time period, and each set of images in the plurality of sets of images associated with a near-miss label indicating whether the respective first vehicle and the respective second vehicle have a near-miss in the respective time period; for each set of images in the plurality of sets of images: applying, by at least one processor, an object detection model to each image in the set of images to determine a respective bounding box representation of the respective first vehicle for each image in the set of images; determining, by the at least one processor, a rate of change of at least one spatial parameter of the bounding box representation for the respective first vehicle across at least a subset of images of the set of images; determining a confidence of near-miss indicator for the set of images by applying, by the at least one processor, a near-miss detection model to the rate of change of the at least one spatial parameter; and evaluating a near-miss loss function, the near-miss loss function including a difference between an indication of near-miss in a respective collision label for the set of images and the determined confidence of near-miss indicator; and training the near-miss detection model by adjusting model parameters to minimize the near-miss loss function over the plurality of sets of images.

Each set of images in the plurality of sets of images may be further associated with a collision label indicating whether the respective first vehicle and the respective second vehicle collide in the respective time period; and the method may further comprise: for each set of images in the plurality of sets of images: determining a confidence of collision indicator for the set of images by applying, by the at least one processor, a collision detection model to the rate of change of the at least one spatial parameter; and evaluating a collision loss function, the collision loss function including a difference between an indication of collision in a respective collision label for the set of images and the determined confidence of collision indicator; and training the collision detection model by adjusting model parameters to minimize the collision loss function over the plurality of sets of images.

Each set of images in the plurality of sets of images may be further associated with a collision label indicating whether the respective first vehicle and the respective second vehicle had a collision in the respective time period; the near-miss detection model may be a combined near-miss and collision detection model; and for each set of images: determining the confidence of near-miss indicator for the set of images by applying the near-miss detection model may further comprise determining a confidence of collision indicator for the set of images by applying the combined near-miss and collision detection model to the rate of change of the at least one spatial parameter; and evaluating the near-miss loss function may comprise evaluating a combined near-miss and collision loss function, the combined near-miss and collision loss function including: a difference between an indication of collision in a respective collision label for the set of images and the determined confidence of collision indicator, and a difference between an indication of near-miss in a respective near-miss label for the set of images and the determined confidence of near-miss indicator; and training the near-miss detection model may comprise training the combined near-miss and collision detection model by adjusting model parameters to minimize the combined near-miss and collision loss function over the plurality of sets of images.

The plurality of sets of images may include only sets of images where the respective first and second vehicle are positioned in a respective common lane of travel.

The method may further comprise for each set of images in the library of training image data: determining whether the set of images includes a representation of the respective first vehicle from the perspective of the respective second vehicle, where the respective first vehicle and the respective second vehicle are positioned in a respective common lane of travel; if the set of images includes the representation of the respective first vehicle from the position of the respective second vehicle, with the respective first vehicle and the respective second vehicle positioned in the respective common lane of travel: including the set of images in the plurality of sets of images; and if the set of images does not include the representation of the respective first vehicle from the position of the respective second vehicle, or the respective first vehicle and the respective second vehicle are not positioned in the respective common lane of travel: excluding the set of images from the plurality of sets of images.

The method may further comprise: determining whether auxiliary criteria are satisfied over each set of images in the plurality of sets of images; and further evaluating the near-miss loss function for at least one set of images in the plurality of sets of images, if the auxiliary criteria are not satisfied. The auxiliary criteria may require that the near-miss loss function be within a maximum loss threshold for each set of images in the plurality of sets of images. The auxiliary criteria may require that the near-miss loss function be within a maximum loss threshold for a defined quantity of sets of images in the plurality of sets of images, where the defined quantity of sets of images is smaller than a total quantity of sets of images in the plurality of sets of images. The auxiliary criteria may require that the near-miss loss function be evaluated for each set of images in the plurality of sets of images. The auxiliary criteria may require that the near-miss loss function be evaluated for a defined quantity of sets of images in the plurality of sets of images, where the defined quantity of sets of images is smaller than a total quantity of sets of images in the plurality of sets of images.

According to yet another broad aspect, the present disclosure describes a system for training a machine-learning model, the system comprising: at least one processor; at least one non-transitory processor-readable storage medium storing processor-executable instructions which when executed cause the system to: access a library of training image data, the library of training image data including sets of images representing respective time periods, at least a plurality of sets of images of the library including respective representations of a respective first vehicle from a perspective of a respective second vehicle over a respective time period, and each set of images in the plurality of sets of images associated with a near-miss label indicating whether the respective first vehicle and the respective second vehicle have a near-miss in the respective time period; for each set of images in the plurality of sets of images: apply, by the at least one processor, an object detection model to each image in the set of images to determine a respective bounding box representation of the respective first vehicle for each image in the set of images; determine, by the at least one processor, a rate of change of at least one spatial parameter of the bounding box representation for the respective first vehicle across at least a subset of images of the set of images; determine a confidence of near-miss indicator for the set of images by applying, by the at least one processor, a near-miss detection model to the rate of change of the at least one spatial parameter; and evaluate a near-miss loss function, the near-miss loss function including a difference between an indication of near-miss in a respective near-miss label for the set of images and the determined confidence of near-miss indicator; and train the near-miss detection model by adjusting model parameters to minimize the near-miss loss function over the plurality of sets of images.

Each set of images in the plurality of sets of images may be further associated with a collision label indicating whether the respective first vehicle and the respective second vehicle collide in the respective time period; and the processor-executable instructions may further cause the system to: for each set of images in the plurality of sets of images: determine a confidence of collision indicator for the set of images by applying, by the at least one processor, a collision detection model to the rate of change of the at least one spatial parameter; and evaluate a collision loss function, the collision loss function including a difference between an indication of collision in a respective collision label for the set of images and the determined confidence of collision indicator; and train the collision detection model by adjusting model parameters to minimize the collision loss function over the plurality of sets of images.

Each set of images in the plurality of sets of images may be further associated with a collision label indicating whether the respective first vehicle and the respective second vehicle collide in the respective time period; the near-miss detection model may be a combined near-miss and collision detection model; and for each set of images: the processor executable instructions which cause the system to determine the confidence of near-miss indicator for the set of images by applying the near-miss detection model may further cause the system to determine a confidence of collision indicator for the set of images by applying the combined near-miss and collision detection model to the rate of change of the at least one spatial parameter; and the processor executable instructions which cause the system to evaluate the near-miss loss function may cause the system to evaluate a combined near-miss and collision loss function, the combined near-miss and collision loss function including: a difference between an indication of collision in a respective collision label for the set of images and the determined confidence of collision indicator, and a differ-ence between an indication of near-miss in a respective near-miss label for the set of images and the determined confidence of near-miss indicator; and training the near-miss detection model may comprise training the combined near-miss and collision detection model by adjusting model parameters to minimize the combined near-miss and colli-sion loss function over the plurality of sets of images.

The plurality of sets of images may include only sets of images where the respective first and second vehicle are positioned in a respective common lane of travel.

The processor executable instructions may further cause the system to, for each set of images in the library of training image data: determine whether the set of images includes a representation of the respective first vehicle from the per-spective of the respective second vehicle, where the respec-tive first vehicle and the respective second vehicle are positioned in a respective common lane of travel; if the set of images includes the representation of the respective first vehicle from the position of the respective second vehicle, with the respective first vehicle and the respective second vehicle positioned in the respective common lane of travel: include the set of images in the plurality of sets of images; and if the set of images does not include the representation of the respective first vehicle from the position of the respective second vehicle, or the respective first vehicle and the respective second vehicle are not positioned in the respective common lane of travel: exclude the set of images from the plurality of sets of images.

The processor executable instructions may further cause the system to: determine whether auxiliary criteria are satisfied over each set of images in the plurality of sets of images; and further evaluate the near-miss loss function for at least one set of images in the plurality of sets of images, if the auxiliary criteria are not satisfied. The auxiliary criteria may require that the near-miss loss function be within a maximum loss threshold for each set of images in the plurality of sets of images. The auxiliary criteria may require that the near-miss loss function be within a maximum loss threshold for a defined quantity of sets of images in the plurality of sets of images, where the defined quantity of sets of images is smaller than a total quantity of sets of images in the plurality of sets of images. The auxiliary criteria may require that the near-miss loss function be evaluated for each set of images in the plurality of sets of images. The auxiliary criteria may require that the near-miss loss function be evaluated for a defined quantity of sets of images in the plurality of sets of images, where the defined quantity of sets of images is smaller than a total quantity of sets of images in the plurality of sets of images.

According to yet another broad aspect, the present dis-closure describes a method for identifying a near-miss between a first vehicle and second vehicle comprising: accessing image data, the image data including a set of images; applying, by at least one processor, an object detection model to each image in the set of images to determine a respective bounding box representation of the first vehicle from the perspective of the second vehicle for each image; determining, by the at least one processor, a rate of change of at least one spatial parameter of the bounding box for the first vehicle across at least a subset of the set of images; applying, by at least one processor, a near-miss detection model to identify a near-miss between the first vehicle and the second vehicle based on the rate of change of the at least one spatial parameter of the bounding box; and outputting an indication of near-miss when the near-miss detection model identifies a near-miss between the first vehicle and the second vehicle.

If applying the object detection model to each image in the set of images to determine a respective bounding box representation of the first vehicle from the perspective of the second vehicle for each image does not result in a determi-nation of any bounding boxes: the method may identify no near-miss between the first vehicle and the second vehicle.

The method may further comprise: determining, by the at least one processor, for each image of the set of images, whether the first vehicle and the second vehicle are posi-tioned in a respective common lane of travel; and if the first vehicle and the second vehicle are not positioned in a respective common lane of travel: determine no near-miss between the first vehicle and the second vehicle.

Accessing the image data may comprise capturing the image data by at least one image capture device positioned at the second vehicle.

Accessing the image data may comprise retrieving the image data stored at a non-transitory processor-readable storage medium.

The at least one processor may be positioned at the second vehicle, and outputting an indication of near-miss may comprises transmitting the indication of near-miss by a communication interface to be received by a device remote from the second vehicle. The method may further comprise outputting an alert to an operator of the device remote from the second vehicle. The method may further comprise trans-mitting, by a communication interface of the device remote from the second vehicle, the indication of near-miss to at least one other vehicle in a geographic region proximate a position of the second vehicle.

According to yet another broad aspect, the present dis-closure describes a system for identifying a near-miss between a first vehicle and second vehicle comprising: at least one processor; at least one non-transitory processor-readable storage medium storing processor-executable instructions which when executed cause the system to: access image data, the image data including a set of images; apply, by the at least one processor, an object detection model to each image in the set of images to determine a respective bounding box representation of the first vehicle from the perspective of the second vehicle for each image; determine, by the at least one processor, a rate of change of at least one spatial parameter of the bounding box for the first vehicle across at least a subset of the set of images; apply, by at least one processor, a near-miss detection model to identify a near-miss between the first vehicle and the second vehicle based on the rate of change of the at least one spatial parameter of the bounding box; and output an indication of near-miss when the near-miss detection model identifies a near-miss between the first vehicle and the second vehicle.

If the processor-executable instructions which cause the system to apply the object detection model to each image in the set of images to determine a respective bounding box representation of the first vehicle from the perspective of the second vehicle for each image does not result in a determination of any bounding boxes: the processor-executable instructions may cause the system to identify no near-miss between the first vehicle and the second vehicle.

The processor-executable instructions may further cause the system to: determine, by the at least one processor, for each image of the set of images, whether the first vehicle and the second vehicle are positioned in a respective common lane of travel; and if the first vehicle and the second vehicle are not positioned in a respective common lane of travel: determine no near-miss between the first vehicle and the second vehicle.

The system may further comprise at least one image capture device positioned at the second vehicle, and the processor-executable instructions which cause the system to access the image data may cause the system to capture the image data by the at least one image capture device positioned at the second vehicle. The system may include a telematic device positioned at the second vehicle, and the at least one processor and the at least one non-transitory processor-readable storage medium may be included in the telematic device.

The processor executable instructions which cause the system to access the image data may cause the system to retrieve the image data stored at the non-transitory processor-readable storage medium.

The system may further comprise a communication interface at the second vehicle, the at least one processor may be positioned at the second vehicle, and the processor-executable instructions which cause the system to output an indication of near-miss may cause the communication interface at the second vehicle to transmit the indication of near-miss to be received by a device remote from the second vehicle. The system may further comprise the device remote from the second vehicle, and the processor-executable instructions may further cause the system to output, by an output interface of the device remote from the second vehicle, an alert to an operator of the device remote from the second vehicle. The system may further comprise the device remote from the second vehicle, and the processor-executable instructions may further cause the system to transmit, by a communication interface of the device remote from the second vehicle, the indication of near-miss to at least one other vehicle in a geographic region proximate a position of the second vehicle.

BRIEF DESCRIPTION OF THE DRAWINGS

Exemplary non-limiting embodiments are described with reference to the accompanying drawings in which:

FIG. 5 is a flowchart diagram which illustrates a method for identifying a collision or near-miss in accordance with at least one exemplary implementation.

DETAILED DESCRIPTION

Figure 1A:
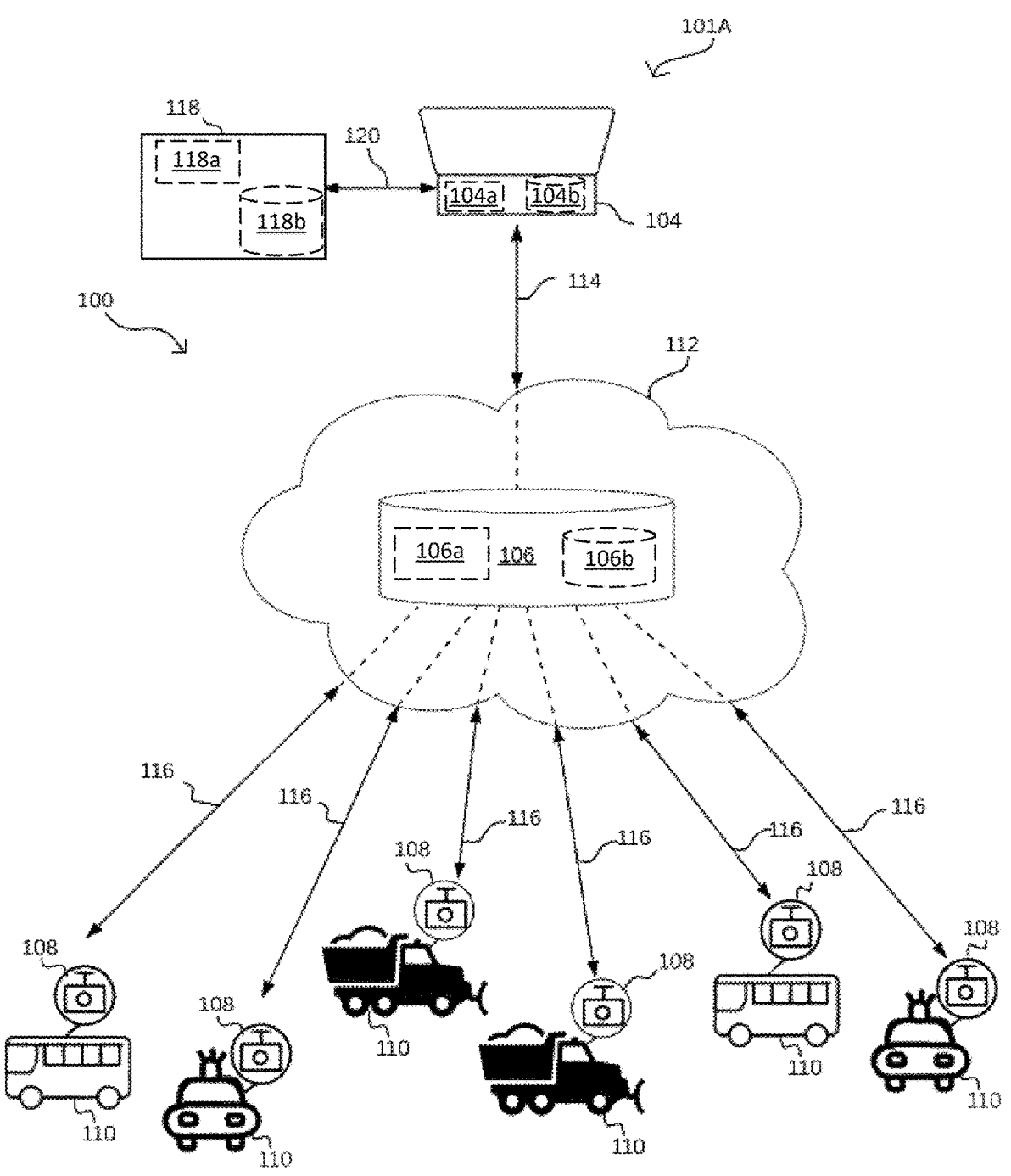
FIG. 1A illustrates a block diagram of an exemplary mobile image system.

The present disclosure details systems and methods for creating training data, for training machine learning models, and for applying machine learning models, for identifying vehicle movement and positioning. The present disclosure sees particular value in detecting collisions or near-miss situations between vehicles.

Throughout this disclosure, a "following" situation refers to a situation where a "following vehicle" is travelling behind a "lead vehicle", in the same direction as the lead vehicle. In this context, "following" does not necessarily mean that the following vehicle is actively pursuing the lead vehicle (e.g. to the destination of the lead vehicle), but rather that the following vehicle is travelling behind the lead vehicle, for at least a moment in time. Lead vehicles and following vehicles are commonly referred to as first and second vehicles throughout this disclosure.

A "collision" of a vehicle refers to when a vehicle contacts another object, such as another vehicle, infrastructure (e.g. posts or buildings), or a person. A "near-miss" refers to a situation where a vehicle is dangerously close to a collision, but a collision itself is avoided.

Models (e.g. algorithmic models, artificial intelligence models, and/or machine learning models) for identifying vehicle positioning and movement, based on data captured by one or more image capture devices (e.g. video cameras or smart video cameras) are disclosed herein. Generally, a machine learning model is trained based on a set of training data, after which the model becomes able to analyze input data and reliably detect features or make determinations based on the input data. In some implementations, a trained model is deployed to an image capture device or a proximate device communicatively coupled to the image capture device, and captured image data is analyzed by the trained model. Such implementations are optimal for alerting the driver to dangerous situations or making immediate determinations, as analysis can be performed quickly without the need for communication with a remote server. In alternative implementations, captured image data is analyzed in accordance with the trained model remote from the image capture device (e.g. at a central server or processing station). Such implementations are useful for identifying dangerous situations after-the-fact, such as for driver evaluation or collision reconstruction. However, such implementations could also be used to alert the driver to dangerous situations as they happen or to identify dangerous situations based on uploaded data, albeit after communication of image data to the central server. In yet other implementations, captured image data can be analyzed at an image capture device or a proximate device communicatively coupled to the image capture device, and results can be sent to a remote device (e.g. a central server or processing station), such as for driver evaluation or collision reconstruction. In yet other implementations, captured image data can be analyzed at an image capture device or a proximate device communicatively coupled to the image capture device, for immediate driver feedback, and captured image data can be analyzed at a remote device such as for driver evaluation or collision reconstruction.

Figure 1B:
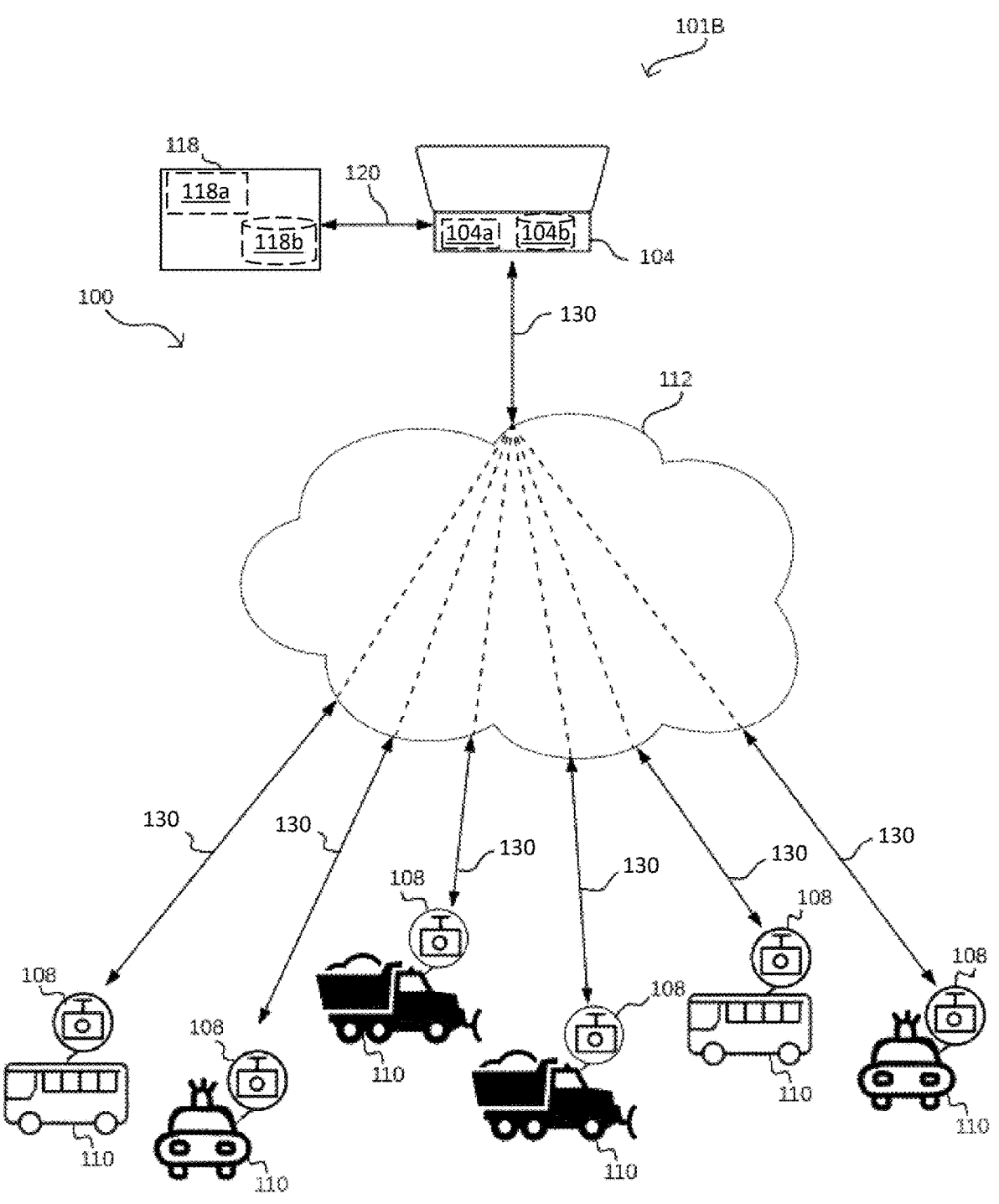
FIG. 1B illustrates a block diagram of another exemplary mobile image system.

FIG. 1A and FIG. 1B illustrate block diagrams of exemplary mobile image systems 101A and 101B, respectively, and exemplary communication network 100 through which mobile image systems 101A and 101B operate. In many of the implementations discussed herein, communication network 100 is optional. That is, in some implementations identification of vehicle positioning and movement can be performed entirely at a device local to a vehicle. Models executed at the device local to the vehicle can be distributed physically (e.g. by connecting the device to another device to transfer the model, or by using a portable storage medium to transfer the model), thus obviating the need for communication network 100. Alternatively, communication network 100 can be used to distribute models to vehicle devices (e.g. by sending models to vehicle devices for download).

Communication network 100 may include one or more computing systems and may be any suitable combination of networks or portions thereof to facilitate communication between network components. Some examples of networks include, Wide Area Networks (WANs), Local Area Networks (LANs), Wireless Wide Area Networks (WWANs), data networks, cellular networks, voice networks, among other networks, which may be wired and/or wireless. Communication network 100 may operate according to one or more communication protocols, such as, General Packet Radio Service (GPRS), Universal Mobile Telecommunications Service (UMTS), GSM®, Enhanced Data Rates for GSM Evolution (EDGE), LTE™, CDMA, LPWAN, Wi-Fi®, Bluetooth®, Ethernet, HTTP/S, TCP, and CoAP/DTLS, or other suitable protocol. Communication network 100 may take other forms as well.

Mobile image system 101A includes a plurality of image capture devices 108, which can comprise (and be referred to herein) as smart video cameras (SVCs), though are not strictly limited as such. The plurality of image capture devices 108 are positioned at (e.g. mounted in/on, or placed within or on) a plurality of vehicles 110. Image capture system 101A also includes cloud server 106, client device 104 and local server 118. Client device 104 is communicatively coupled to local server 118 via communication link 120. Client device 104 is also shown as including at least one processor 104a and at least one non-transitory processor-readable storage medium 104b. The at least one processor 104a can perform acts such as determinations, identification, data analysis, processing, and other appropriate acts, such as acts in the methods described herein. The at least one non-transitory processor-readable storage medium 104b can store any appropriate data, including processor-executable instructions which when executed by the at least one processor 104a cause the client device 104 to perform acts, such as acts of the methods described herein. An exemplary client device may include a personal computer, server, a system, a combination of subsystems, and devices. Specific and non-limiting examples of an image capture device or smart video camera include a Netradyne® video camera and a Nauto® video camera. Reference to a "camera" in this disclosure can include a smart video camera, but may also include a more basic camera. In this regard, the term "camera" can be used interchangeably with "image capture device". Each image capture device 108 is communicatively coupled to cloud server 106 in cloud 112 via a respective communication link 116. For example, each image capture device 108 and the cloud server 106 are configured to wirelessly communicate to each other. Cloud server 106 is also shown as including at least one processor 106a and at least one non-transitory processor-readable storage medium 106b. The at least one processor 106a can perform acts such as determinations, identification, data analysis, processing, and other appropriate acts, such as acts in the methods described herein. The at least one non-transitory processor-readable storage medium 106b can store any appropriate data, including processor-executable instructions which when executed by the at least one processor 106a cause the cloud server 106 to perform acts, such as acts of the methods described herein. Cloud server 106 is communicatively coupled to client device 104 via communication link 114. For example, each cloud server 106 and client device 104 are configured to wirelessly communicate to each other. As another example, cloud server 106 and client device 104 are configured to communicate with each over a wired connection. In some implementations, local server 118 may be a remote server from client device 104. Local server 118 is also shown as including at least one processor 118a and at least one non-transitory processor-readable storage medium 118b. The at least one processor 118a can perform acts such as determinations, identification, data analysis, processing, and other appropriate acts, such as acts in the methods described herein. The at least one non-transitory processor-readable storage medium 118b can store any appropriate data, including processor-executable instructions which when executed by the at least one processor 118a cause the local server 118 to perform acts, such as acts of the methods described herein.

Mobile image system 101B in FIG. 1B includes a plurality of image capture devices 108, positioned at a plurality of vehicles 110, similar to in FIG. 1A. Image system 101B also includes client device 104 and local server 118, similar to in FIG. 1A. In the example of FIG. 1B, client device 104 is communicatively coupled to local server 118 via communication link 120. An exemplary client device may include a personal computer, server, a system, a combination of systems, subsystems, and devices. Specific and non-limiting examples of an image capture device include a Netradyne® video camera and a Nauto® video camera. Each image capture device 108 is communicatively coupled to client device 104 via a respective communication link 130. For example, each image capture device 108 is configured to wirelessly communicate with client device 104. In some implementations, local server 118 may be a remote server from client device 104. The description of components in mobile image system 101A in FIG. 1A is applicable to similarly labelled components in mobile surveillance system 101B in FIG. 1B.

Specific and non-limiting examples of vehicle types which each of vehicles 110 can be include: a government owned and operated vehicle, (e.g., as a vehicle for snow clearing, infrastructure maintenance, police enforcement), a public transportation vehicle, (e.g., bus, train), and a privately owned vehicle, (e.g., taxi, courier vehicle), among others.

An image capture device 108 may be mounted to or positioned at a vehicle 110 in a manner such that image capture device 108 captures image data of the environment outside the vehicle 110, e.g., towards the windshield, towards a window, atop the vehicle, etc. Additionally, and/or optionally, an image capture device 108 may be mounted to or positioned at a vehicle 110 in a manner such that the image capture device 108 captures image data of the interior of the vehicle. Interior-facing image capture devices 108 may be useful for detecting an event including detecting a person(s) of interest.

Alternatively, and/or optionally, mobile image systems 101A, 101B further include one or more image capture devices 108 coupled to a person and/or object wherein the object is not a vehicle. For example, an image capture device 108 can be coupled to a person, e.g., a helmet of a motorcycle driver.

Figure 2A:
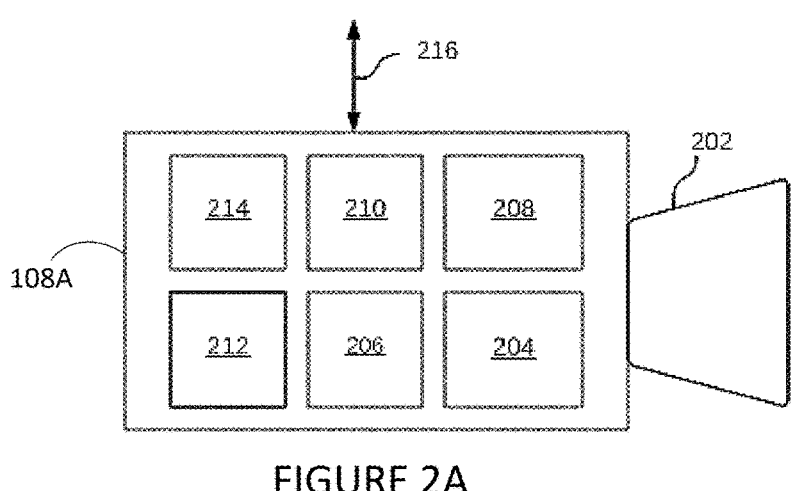
FIG. 2A is a simplified block diagram of an image capture device according to at least one exemplary implementation.

Now referring to FIG. 2A, shown is a simplified block diagram of exemplary image capture device 108A according to one implementation (as a smart video camera). Image capture device 108A as shown in FIG. 2A can be implemented as any of the image capture devices 108 shown in FIGS. 1A and 1B. Image capture device 108A includes lens 202, optoelectronics 204, at least one processor 206, location module 208 (e.g., including a GPS receiver), wireless communication module 210 (e.g., including a 4G or 5G communication module for providing cellular connectivity) and at least one non-transitory processor-readable storage medium 212. Optionally, the at least one non-transitory processor-readable storage medium 212 includes another non-transitory processor-readable storage medium 214 (or includes any appropriate number of additional non-transitory processor-readable storage mediums). In the context of this disclosure, the term "datastore" refers to a non-transitory processor-readable storage medium. In some implementations, a single non-transitory processor-readable storage medium corresponds to a single datastore. In other implementations, a non-transitory processor-readable storage medium can be virtually partitioned to include a plurality of "datastores". Wireless communication module 210 is operable to communicate (shown as communication interface 216) with other devices (e.g. cloud device 106 or client device 104 discussed with reference to FIGS. 1A and 1B) over a communication network (e.g. cloud 112 discussed with reference to FIGS. 1A and 1B).

Figure 2B:
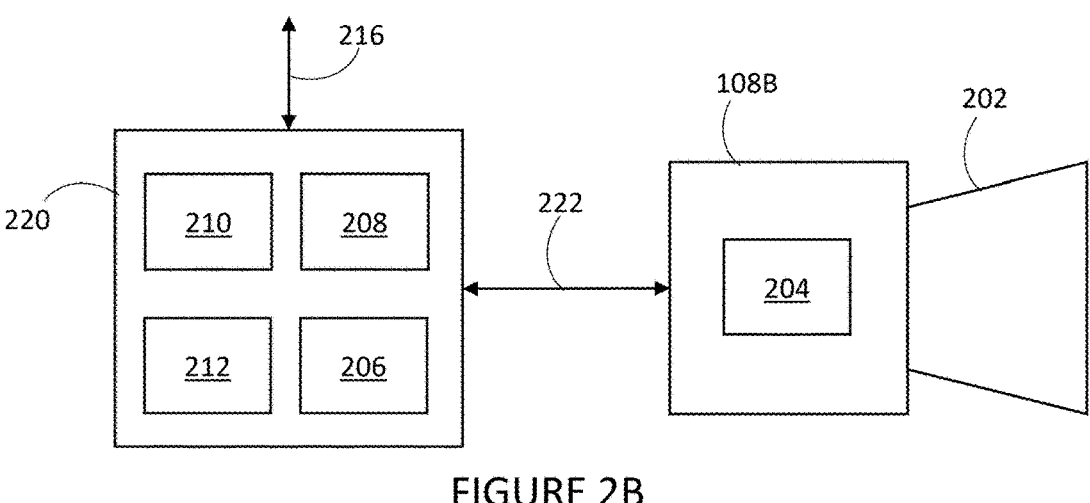
FIG. 2B is a simplified block diagram of an image capture device according to at least one other exemplary implementation.

Now referring to FIG. 2B, shown is a simplified block diagram of exemplary image capture device 108B according to one implementation (as a camera which is coupled to a peripheral device, such as a vehicle device). FIG. 2B includes many components with the same reference number as components discussed with reference to FIG. 2A. The description of such components in FIG. 2A is applicable to the similarly numbered components in FIG. 2B. In FIG. 2B, image capture device 108B includes lens 202 and optoelectronics 204. In this implementation, image capture device 108B is itself directed to capturing image data, which is in turn provided to a peripheral device 220 via a communication interface 222 (e.g. a wired or wireless communication interface). In some implementations, peripheral device 220 is vehicle device, such as a telematics monitoring device positioned at a vehicle. In other implementations, peripheral device 220 comprises a collection of components integrated into a vehicle which communicate with each other (e.g. OEM integrated electronics). In FIG. 2B, peripheral device 220 is shown as including the at least one processor 206, the location module 208, the wireless communication module 210, and the at least one non-transitory processor-readable storage medium 212, similar to the components included in image capture device 108A in FIG. 2A. While not illustrated in FIG. 2B to reduce clutter, the at least one non-transitory processor-readable storage medium 212 optionally includes any appropriate number of additional non-transitory processor-readable storage mediums. Wireless communication module 210 is operable to communicate (shown as communication interface 216) with other devices (e.g. cloud device 106 or client device 104 discussed with reference to FIGS. 1A and 1B) over a communication network (e.g. cloud 112 discussed with reference to FIGS. 1A and 1B).

Collectively, reference to an image capture device 108 or a plurality of image capture devices 108 can include image capture device 108A in FIG. 2A or image capture device 108B in FIG. 2B. Further, reference to an image capture device performing acts (such as in the methods discussed herein) can also refer to the peripheral device 220 performing such acts. For example, reference to an image capture device performing processing, determination, identification, storing of data, transmission, or similar acts can refer to an image capture device and peripheral device in combination performing these acts.

Figure 3:
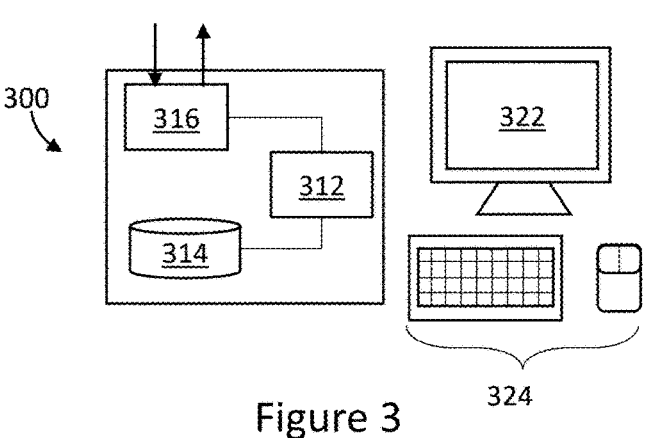
FIG. 3 is a schematic view of an operator device in accordance with at least one exemplary implementation.

FIG. 3 is a schematic view of an operator device 300, which could be used for model management and use in any of the implementations discussed herein, and in particular is useful as a server-side device. For example, device 300 could be used as client device 104 in FIGS. 1A and 1B, or as a user interface device to provide input to these devices. Device 300 as illustrated includes at least one processor 312, at least one non-transitory processor-readable storage medium 314, and a communication interface 316. The non-transitory processor-readable storage medium 314 can have processor-readable instructions stored thereon which, when executed by the at least one processor 312 cause the device 300 to perform appropriate operations for the methods described herein. Communication interface 316 can be a wired or wireless interface, through which data and inputs can be provided to device 300, and through which data and outputs can be provided by device 300. For example, location data for a plurality of vehicles can be received from a telematics device or system by communication interface 316, for processing and analysis by the at least one processor 312. Resulting analysis can also be output by communication interface 316.

FIG. 3 also illustrates exemplary input and output devices (input and output interfaces) through which a user or operator can interact with device 300. In particular, FIG. 3 shows a display 322, which can display outputs from device 300. Other output devices could be provided such as speakers, or any other appropriate output device. FIG. 3 also shows a keyboard and mouse 324, which can be used to provide inputs to the device 300. Other input devices could also be used, such as a touchscreen, microphone, trackpad, or any other appropriate input device. Although the input and output devices illustrated in FIG. 3 appear in the form of those used with a desktop computer, other forms of devices could also be used, such as portable devices like a laptop, smartphone, PDA, tablet, or any other appropriate device. Further, a device to which a user provides input and receives output can be remote from the device 300. For example, the device including the at least one processor 312, the at least one non-transitory processor-readable storage medium 314, and the communication interface 316 can be a server, which is remote from a workstation or device with which the user interacts.

FIGS. 4A, 4B, 4C, and 4D illustrate respective images 400, 402, 404, and 406, each corresponding to sequential moments in time. In this regard, FIGS. 4A, 4B, 4C, and 4D can be considered as a set of images representing a particular period of time. Although four images are shown (representing four moments), any number of images can represent a particular period of time, as appropriate for a given scenario or application.

Images 400, 402, 404, and 406 represent the perspective of an image capture device positioned in a second vehicle which is following a first vehicle 480. Images 400, 402, 404, and 406 show a horizon 410 and a roadway delineated by road edges 412 and 414. The illustrated roadway includes two separate lanes 420 and 422, separated by dashed center line 416. In the illustrated example, first vehicle 480 (lead vehicle) and the second vehicle (following vehicle) are represented as driving in the right-hand lane, though images can be captured with vehicles travelling in any appropriate lane.

Vehicle 480 is shown surrounded by bounding box 490 in image 400, by bounding box 492 in image 402, by bounding box 494 in image 404, and by bounding box 496 in image 406. These bounding boxes can be determined by running an object detection model on each image. The object detection model is pre-trained to identify vehicles. Optionally, the object detection model can also detect road lanes, and be restricted to identifying vehicles in a common lane of travel as the second vehicle (such as discussed later with reference to FIGS. 8A, 8B, 8C, 9A, and 9B). Further optionally, the object detection model may only be executed on a select region of each image (such as a horizontally-center region) where vehicles of interest might be positioned.

Figure 4A:
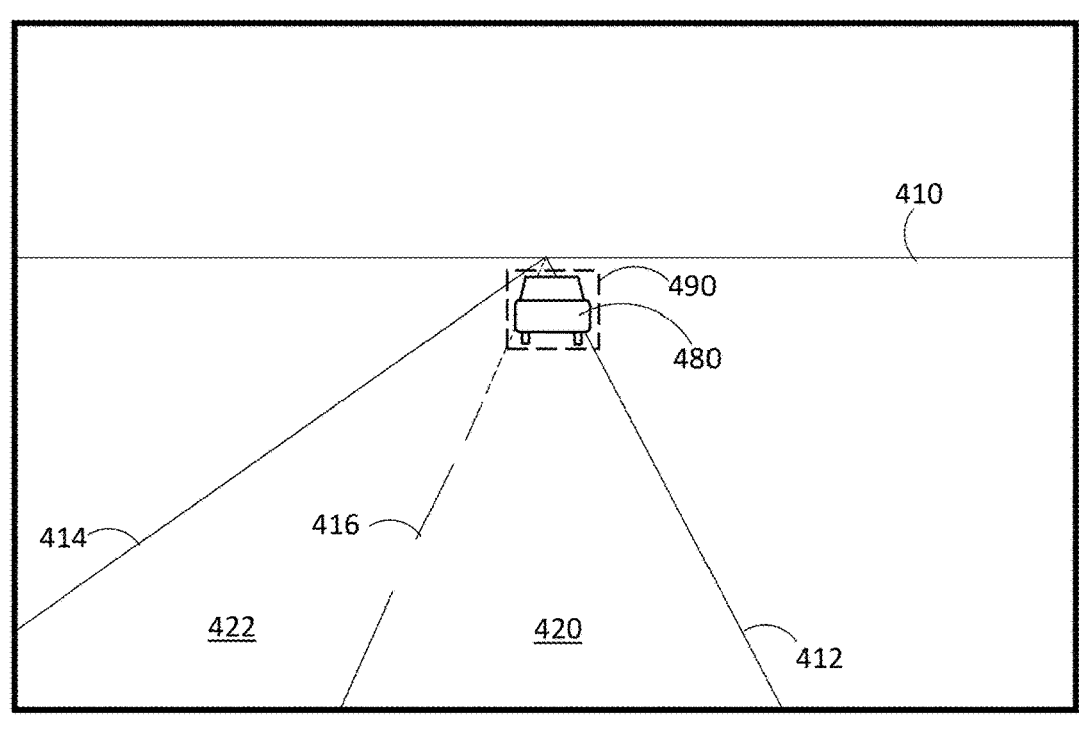
FIGS. 4A, 4B, 4C, and 4D show exemplary image data including representations of a first vehicle in front of a second vehicle.
Figure 4B:
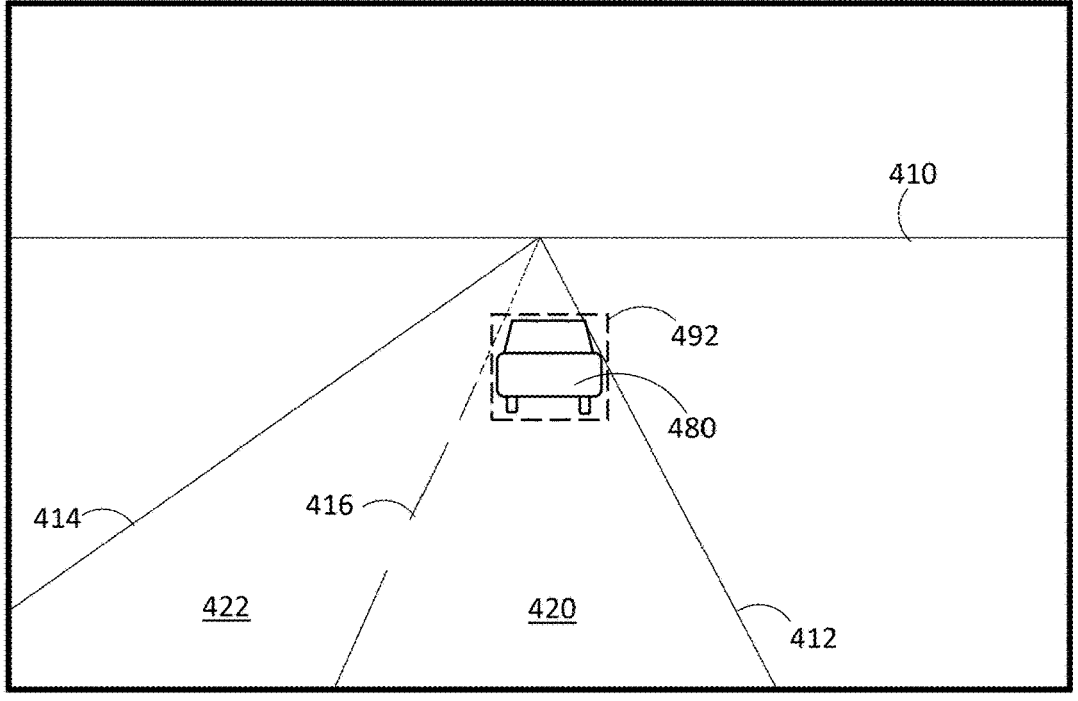
Figure 4C:
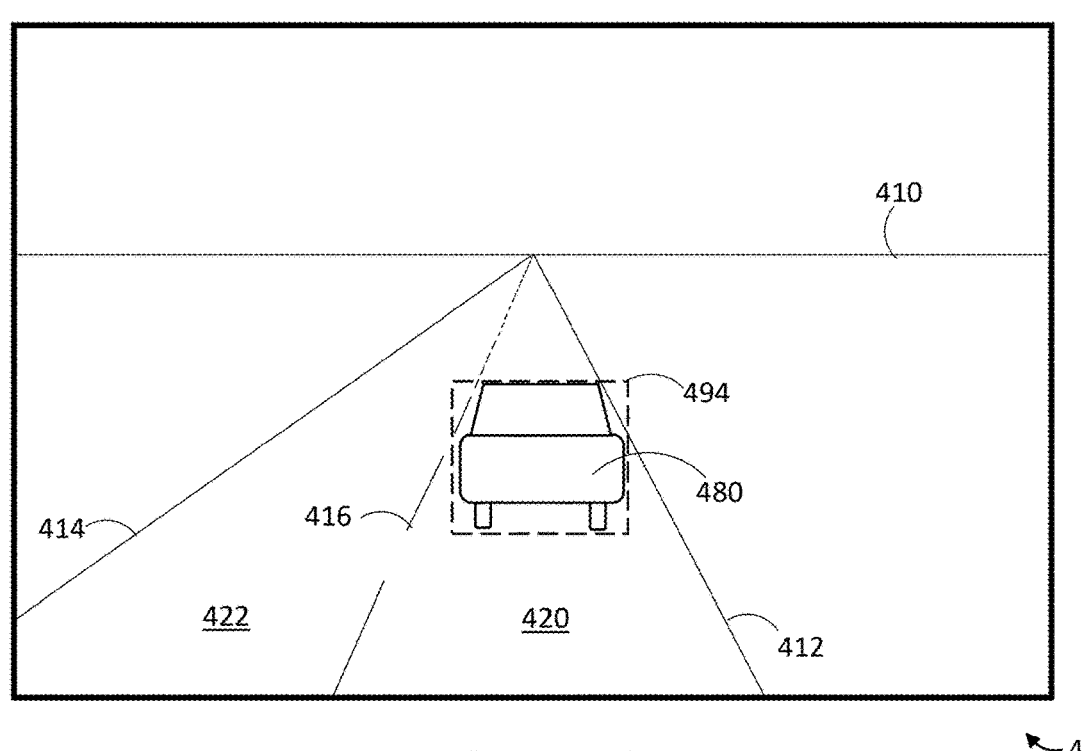

In image 400 of FIG. 4A, first vehicle 480 is far away from the second vehicle. In image 402 of FIG. 4B, first vehicle 480 is closer to the second vehicle than in image 400, but is still relatively far from the second vehicle. Bounding box 492 is only moderately bigger (about 30% bigger in the illustrated example) than bounding box 490. In image 404 of FIG. 4C, first vehicle 480 is closer to the second vehicle than in image 402. Bounding box 494 is bigger (about 40% bigger in the illustrated example) than bounding box 492. In image 406 of FIG. 4D, first vehicle 480 is closer to the second vehicle than in image 404. Bounding box 496 is significantly bigger (nearly 200% bigger in the illustrated example) than bounding box 494.

The example of FIGS. 4A-4D illustrates that as a vehicle approaches an image capture device (the closer the first and second vehicle are together), the more significant a difference in size of the bounding box which surrounds the first vehicle between images (frames or moments). That is, the closer the first and second vehicle are to each other, the greater the rate of change of a size of the bounding box of the first vehicle when the distance between the vehicles changes. As a result, as the first and second vehicles become close together, the rate of change of a size of the bounding box of the first vehicle increases. This disclosure discusses means for detecting collisions or near misses at least in part based on this rate of change.

FIG. 5 is a flowchart diagram which illustrates an exemplary method 500 for identifying and outputting an indication of a vehicular collision or a near-miss. Method 500 as illustrated includes acts 502, 504, 506, 510, 512, 514, and 520. One skilled in the art will appreciate that additional acts could be added, acts could be removed, or acts could be reordered as appropriate for a given application. With reference to the examples illustrated in FIGS. 1A, 1B, 2A, 2B, and 3, acts can be performed by appropriate components of the discussed systems or devices. For example, method 500 can be performed at an image capture device such as image capture device 108A discussed with reference to FIG. 2A, and/or a peripheral device such as peripheral device 220 discussed with reference to FIG. 2B. As another example, method 500 can be performed at a device remote from a vehicle, such as client device 104 and/or local server 118 discussed with reference to FIGS. 1A and 1B, and/or cloud device 106 discussed with reference to FIG. 1A.

Reference to "at least one processor" or "a processor" performing acts of any of the methods herein can refer to any appropriate processor. Further, at least one non-transitory processor-readable storage medium can store processor-executable instructions, which when executed by a respective at least one processor cause the corresponding system or device to perform a given act of any of the methods discussed herein.

At 502, image data is accessed. The image data is captured by an image capture device (such as image capture device 108A or 108B discussed with reference to FIGS. 2A and 2B), and stored by an appropriate non-transitory processor-readable storage medium (e.g. medium 212 in FIGS. 2A and 2B). In some implementations the image data is transferred from the image capture device to another device (such as from any of image capture device 108 in FIGS. 1A and 1B, to cloud device 106, client device 104, or local server 118, via communication interfaces 114, 116, 120, or 130) as appropriate. The transferred image data is stored by a corresponding non-transitory processor-readable storage medium (e.g. any of mediums 104b, 118b, or 106b, as appropriate), and accessed in accordance with act 502 when method 500 is carried out. Accessing the image data in act 502 can comprise capturing the image data by at least one image capture device, or can include accessing the image data as stored in a non-transitory processor-readable storage medium (as previously captured by at least one image capture device). That is, in some implementations the scope of method 500 includes capturing of the image data, and in some implementations the scope of method 500 excludes the actual capturing of the image data.

The image data accessed at 502 includes a set of images. The set of images includes multiple images, each image representing a respective moment in time, such that the set of images as a whole represents a period of time. For example, images 400, 402, 404, and 406 discussed earlier with reference to FIGS. 4A, 4B, 4C, and 4D can comprise a set of images in an exemplary scenario.

At 504, at least one processor (e.g. processor 206, 104a, 118a, 106a, or 312 as appropriate) analyzes the image data to identify and delineate a first vehicle (if present) as represented in the image data. In particular, the at least one processor applies an object detection model to determine a bounding box representation of a first vehicle from the perspective of a second vehicle for each image in the set of images. For example, such an object detection model is trained to identify and delineate at least vehicles in image data. The YOLO models are exemplary models which are effective in this task, but any other appropriate model could also be used. Optionally, act 504 can include identifying and delineating only a first vehicle which is travelling in a common lane of travel with the second vehicle (and thus poses a more significant collision risk). For example, the object detection model may only be applied to a limited horizontal region of image data, such that only a first vehicle directly in front of the second vehicle will be identified. As another example, a lane detection model or algorithm can be executed which identifies lane delineation, and a lane of travel of the second vehicle, such that at 504 in method 500 only a first vehicle identified within the lane of travel of the second vehicle is delineated. As another example, FIGS. 8A, 8B, 8C, 9A, and 9B discussed later show an exemplary technique for identifying whether a first vehicle is in a common lane of travel with the second vehicle.

In determining the bounding box representation of the first vehicle (for each image), the at least one processor also determines at least one spatial parameter of the bounding box. The spatial parameter is indicative of a size of the bounding box, and can include any appropriate dimension. Exemplary spatial parameters are discussed below with reference to FIG. 6.

Figures 6, 7:
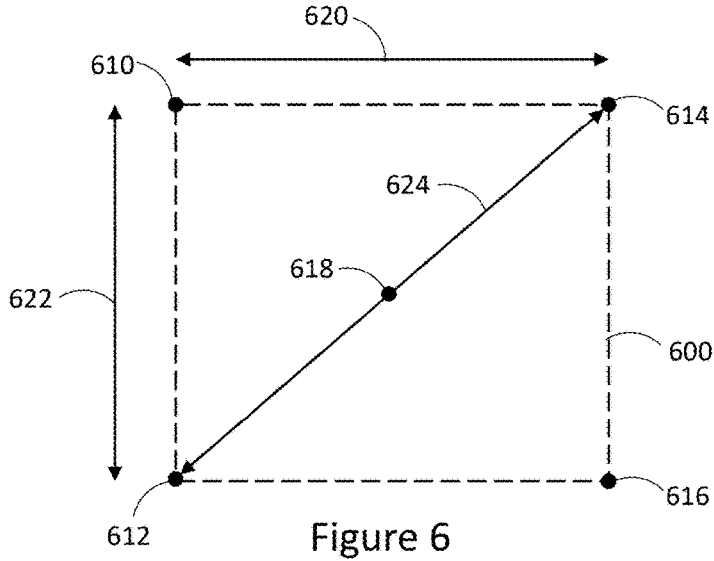
FIG. 6 is a geometric view of an exemplary bounding box and spatial dimensions thereof.
FIG. 7 is a table which illustrates timing data and spatial parameter data in accordance with one exemplary scenario.

FIG. 6 illustrates an exemplary bounding box 600. Boundary box 600 is a rectangle having four corners 610, 612, 614, and 616, and a center point 618. Three exemplary spatial dimensions of boundary box 600 are shown. As one spatial dimension, a width 620 of boundary box 600 is shown, representing a horizontal size of bounding box 600 between corners 610 and 614 (or between corners 612 and 616). As another spatial dimension, a height 622 of boundary box 600 is shown, representing a vertical size of bounding box 600 between corners 610 and 612 (or between corners 614 and 616). As yet another spatial dimension, a diagonal dimension 624 of boundary box 600 is shown, representing a diagonal size of bounding box 600 between corners 612 and 614. While not explicitly illustrated to reduce clutter, a diagonal dimension can also be between corners 610 and 616.

Information which defines a bounding box can be stored in many appropriate ways. In some implementations, a bounding box can be identified by a coordinate which represents a corner of the bounding box, together with a width and height of the bounding box. Similarly, in some implementations a bounding box can be identified by a coordinate which represents a center of the bounding box (shown as center point 618), together with a width and height of the bounding box. In such implementations, two spatial dimensions are available in the information by which the bounding box is identified: width and height. Either or both of these spatial dimensions can be used in the context of method 500. In some implementations, a bounding box can be identified by a set of coordinate pairs, each coordinate pair identifying a respective corner of the bounding box. Such an implementation is particularly useful in cases where a bounding box is not necessarily a rectangle with a horizontal and vertical dimension (e.g. trapezoidal bounding boxes, or tilted rectangular bounding boxes). In such implementations, the at least one processor which performs method 500 can derive at least one spatial dimension of the bounding box, e.g. by determining a difference or line length between two points of the bounding box.

In any of the above implementations, other spatial dimensions for a bounding box can be determined using appropriate mathematical formulae. For example, an area of a rectangular bounding box can be determined by multiplying a width and height of the bounding box.

The above spatial parameters are merely examples of what could be used in the context of method 500. Other spatial parameters could be implemented as appropriate for a given application.

At 506, if no first vehicle is identified in the image data (or no first vehicle is identified in a common lane of travel with the second vehicle) based on application of the object detection model at 504, method 500 proceeds to act 520, where no collision (and optionally no near miss) is identified. In some implementations, an affirmative indicator can be output which explicitly indicates that no collision and/or no near miss is identified in the set of images. In other implementations, the lack of identified collision/near miss can be implicit. Specifically, in such implementations no affirmative indication of collision or near miss is output, but rather it can be inferred that no collision or near-miss is identified.

If a first vehicle is identified in the image data (and corresponding bounding box representation of the first vehicle is determined), method 500 proceeds to 510. At 510, the at least one processor determines a rate of change of at least one spatial parameter of the bounding box representation for the first vehicle. That is, a difference between the spatial parameter of the bounding box between at least two images in the set of images is determined. In some implementations, the determined difference can be divided by an amount of time between the at least two images, to produce a consistent rate of change regardless of how far apart any two images are in time. In other implementations, the determined difference does not need to be divided by an amount of time, but rather determined differences can be compared directly (in act 512 discussed later), provided that there is a consistent amount of time between images for which difference in the spatial parameter is determined.

Figure 4D:
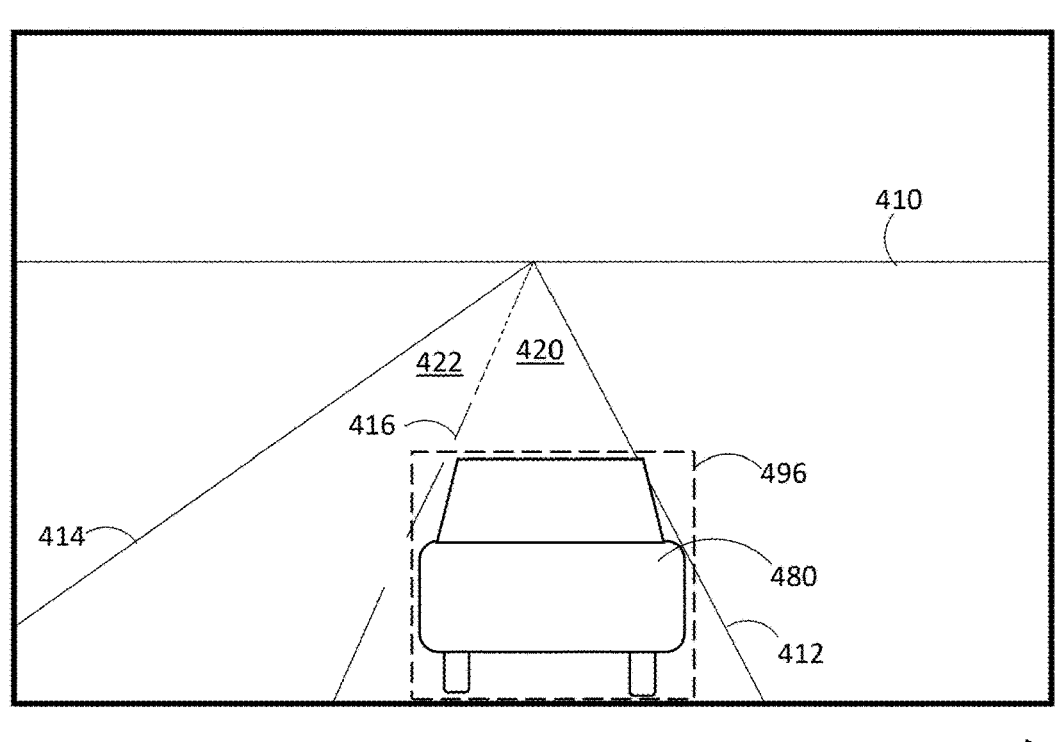

Importantly, the at least two images (the subset of the set of images) do not need to span the entire set of images (or the entire period of time which the set of images spans). With reference to the example of FIGS. 4A-4D, the set of images spanning FIGS. 4A-4D can cover a lengthy period of time. As a result, even though the difference between a spatial dimension of bounding box 490 in FIG. 4A and bounding box 496 in FIG. 4D is large (bounding box 496 is more than triple the size of bounding box 490), a rate of change of a spatial dimension of the bounding box representation may not actually be particularly high. In contrast, images 404 and 406 in FIGS. 4C and 4D cover a much smaller period of time. As such, a rate of change of a spatial dimension of the bounding box between representation 494 in FIG. 4C and 496 in FIG. 4D is higher than across all of the images in the set of images.

In general, a subset of a set of images can be selected or tuned so as to optimize identification of collisions or near misses based on the discussed rate of change. For example, if image data is captured at 15 frames per second (FPS), the set of image data could be parsed per second (i.e. a set of images in method 500 can include 15 images), and rate of change for a bounding box could be determined in subsets of 5 frames (⅓ second intervals). As another example, rate of change can be determined in a "rolling" manner. That is, rate of change could be determined between a first image and a second image a certain amount of time apart, then method 500 can be performed again (iteratively) between the second image and a third image.

Further, the above examples discuss determining rate of change as a difference in spatial dimension between two frames. However, other ways of determining rate of change can be performed. For example, the subset of images can include more than two images, and individual rates of change can be determined between sequential images. An overall rate of change for the entire subset of images can be determined by averaging the individual rates of change determined within the subset of images. Such an implementation advantageously offsets errors in identification of bounding box dimensions or similar which can lead to false positive detections.

At 512, the at least one processor applies a collision detection model to identify a collision between the first vehicle and the second vehicle based on the rate of change of the at least one spatial parameter of the bounding box. Optionally, a near-miss detection model can also be applied at 512. In some implementations, a single model can be applied which is both a collision detection model and a near-miss detection model. Such a model can still be referred to as a "collision detection model", but is more flexible in terms of output such that both collisions and near-misses can be identified. Such a model can also be referred to as a "combined collision and near-miss detection model", or a "combined near-miss and collision detection model". In other implementations, two separate models can be applied, one model being a collision detection model to detect collisions, the other being a near-miss detection model to detect near misses. Generally throughout this specification, reference to executing a collision detection model can also include executing a near-miss detection model, and/or a collision detection model with the ability to identify near-misses.

The collision (and/or near miss) detection model is a trained machine learning model, as discussed later with reference to FIG. 13. The at least one processor executes the collision detection model, using at least the rate of change determined in act 510 as input. Other inputs can also be provided to the collision detection model, such as vehicle motion data (e.g. speed or acceleration), as collected by or based on data from at least one sensor at the second vehicle (e.g. location sensor, speed sensor, accelerometer, tachometer, etc.). The collision detection module produces an output indicative of whether or not the collision detection model determines that a collision (or near-miss) has occurred between the first vehicle and the second vehicle. For example, the collision model can output a confidence score indicative of a confidence level of the collision detection model that a collision has occurred.

At 514, the system outputs an indication of collision when the collision detection model identifies a collision between the first vehicle and the second vehicle. In some implementations, outputting the indication of collision comprises transmitting an alert, notification, or report of the collision situation to a management device (such as any of client device 104, cloud server 106, or local server 118, via communication interfaces 114, 116, 120, or 130 discussed with reference to FIG. 1A or 1B). Such an alert is useful for notifying appropriate parties of emergency situations. Exemplary uses of such an indication are discussed later with reference to FIG. 10.

In some implementations, the collision detection model outputs a binary indication of collision (e.g. either "collision" or "no collision"). Such a binary indication can also be implicit (e.g. the collision detection model can output "collision" when a collision is detected, and provide no output indication when a collision is not detected, which implicitly is interpretable as "no collision"). In implementations where a near-miss detection model is applied, the near-miss detection model can output a binary indication of "near-miss" or "no near-miss". Such a binary indication can also be implicit (e.g. the near-miss detection model can output "near-miss" when a near-miss is detected, and provide no output indication when a near miss is not detected, which implicitly is interpretable as "no near-miss"). In some implementations, the collision detection model outputs a trinary indication, such as "Collision", "Near-Miss", or "No Collision or Near-Miss". Such a result can also be output by a combination of separate collision detection model and near-miss detection model. In one example "Collision" is output when the collision detection model identifies a collision regardless of an output of the Near-Miss detection model; "Near-Miss" is output when the near-miss detection model identifies a near-miss and the collision detection model identifies no collision; and "No Collision or Near-miss" is output when the collision detection model identifies no collision and the near-miss detection model identifies no near-miss. Such a trinary indication can also be implicit (e.g. "collision" is output when a collision is detected, "near-miss" is output when a near miss is detected, and no output indication is provided when neither a collision nor a near-miss is identified).

In such implementations, outputting the indication of collision or near-miss can comprise formatting, transmitting, storing, or otherwise providing or presenting the indication of collision, e.g. for future use, for use by another device, or presenting the indication to an operator or driver.

In other implementations, the collision detection model itself does not output an explicit indication of collision. For example as mentioned above, the collision detection model can output a confidence score indicating a determined likelihood by the collision detection model that a collision has occurred. In such implementations, at 514 the at least one processor determines an explicit indication of collision where appropriate. In an exemplary implementation, a confidence threshold is set, and the at least one processor compares the confidence score output by the collision detection model to the confidence threshold. If the confidence score satisfies the threshold (meets or exceeds the confidence threshold), the at least one processor determines that collision has occurred. If the confidence score does not satisfy the confidence threshold (the confidence score is below the confidence threshold), the at least one processor determines that no collision has occurred.

In implementations where a near-miss detection model is applied, the near-miss detection model can output a confidence score indicating a determined likelihood by the near-miss detection model that a near-miss has occurred. In such implementations, at 514 the at least one processor determines an explicit indication of near-miss where appropriate. In an exemplary implementation, a confidence threshold is set, and the at least one processor compares the confidence score output by the near-miss detection model to the confidence threshold. If the confidence score satisfies the threshold (meets or exceeds the confidence threshold), the at least one processor determines that a near-miss has occurred. If the confidence score does not satisfy the confidence threshold (the confidence score is below the confidence threshold), the at least one processor determines that no near-miss has occurred.

In implementations where both a collision detection model and a near-miss detection model are applied (whether as aspects of a single model, or as two separate models) the model or models can output respective confidence scores indicating respective determined likelihoods by the near-miss detection model and the collision detection model that a near-miss or a collision has occurred. If neither respective confidence score exceeds a confidence threshold (or respective collision confidence threshold or near-miss confidence threshold), then an indication of "No collision and no near-miss" can be output (or no indication can be output, implying no collision and no near-miss). If one or both respective confidence score exceeds a confidence threshold (or respective collision confidence threshold or near-miss confidence threshold), then an indication can be output corresponding to the detected event with the higher confidence score (e.g. "Collision" can be output if confidence score from the collision detection model is higher than confidence score from the near-miss detection model; "Near-miss" can be output if confidence score from the near-miss detection model is higher than confidence score from the collision detection model).

In such implementations, outputting the indication of collision or near-miss can comprise formatting, transmitting, storing, or otherwise providing or presenting the indication of collision or near-miss, as determined by the at least one processor, e.g. for future use, for use by another device, or presenting the indication to an operator or driver.

Detailed exemplary implementations for outputting the indication of collision (or near-miss) are discussed later with reference to FIGS. 10-12.

FIG. 7 illustrates a set of hypothetical data which could arise in the context of method 500. In particular, FIG. 7 illustrates data for a plurality of frames 0 through 16, which can be considered as an exemplary "set of images" in the context of method 500, with each "frame" of data being a respective image. Frames 0 through 16 represent image data captured at 15 frames per second, such that the interval between each frame is 0.0625 seconds. The second column in FIG. 7 is a time corresponding to each frame, relative to frame 0 (which corresponds to a time of 0 seconds). The times in column 2 could be specified in any appropriate way, such as a local time of the image capture device which captures the set of images, or at a set time of a server central to a plurality of image capture devices, or any other time keeping means as appropriate for a given application. The third column in FIG. 7 illustrates a determined spatial parameter for a bounding box (as determined in accordance with act 504 in method 500). The fourth column in FIG. 7 illustrates a difference in the spatial parameter to a previous frame.

FIG. 7 illustrates a hypothetical scenario where a collision occurs between a first and second vehicle. In accordance with method 500 in FIG. 5, this collision can be detected. In particular, the fourth column (Spatial Parameter Difference) can be determined based on each image (frame) in accordance with act 510 in method 500, based on bounding box representations of the first vehicle as determined at act 504. Further, applying a collision detection model as in act 512 of method 500 entails, in one exemplary implementation, applying a threshold model where a collision is identified when the spatial parameter difference exceeds a threshold. In this example, a collision can be identified when the spatial parameter difference is greater than 70 pixels. In FIG. 7, while the spatial parameter difference increases until frame 8, it is at frame 9, where the spatial parameter difference is 80 pixels, that the threshold is exceeded. Thus, in this example a collision is detected at frame 9. Spatial parameter difference increases for a few more frames, then decreases when the collided vehicles stop moving relative to each other.

In another exemplary implementation, applying a collision detection model as in act 512 of method 500 entails, applying a machine-learning based collision detection model, such as one trained as discussed later with reference to FIG. 13.

As mentioned earlier, at 506 in method 500, a determination is made as to whether a first vehicle is identified in the image data. In some implementations, this determination can entail determining whether a first vehicle is identified in the image data which is in a common lane of travel of the second vehicle. That is, a determination can be made as to whether the first vehicle is actually in front of the second vehicle, and thus poses a more significant collision risk than if the first vehicle is in a different lane of travel than the second vehicle. FIGS. 8A, 8B, 8C, 9A, and 9B discussed below illustrate an exemplary methodology for determining whether the first vehicle is in a common lane of travel with the second vehicle.

Figure 8A:
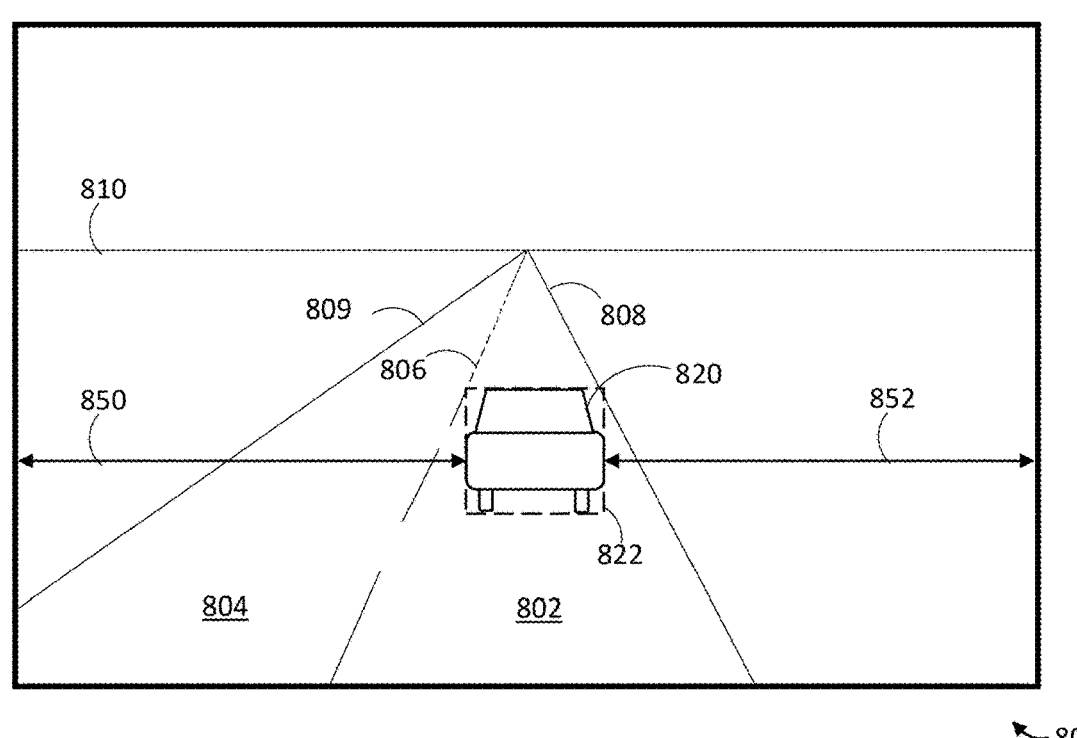
FIGS. 8A, 8B, and 8C illustrate exemplary images from an image capture device, showing a lead vehicle in different horizontal positions.
Figure 8B:
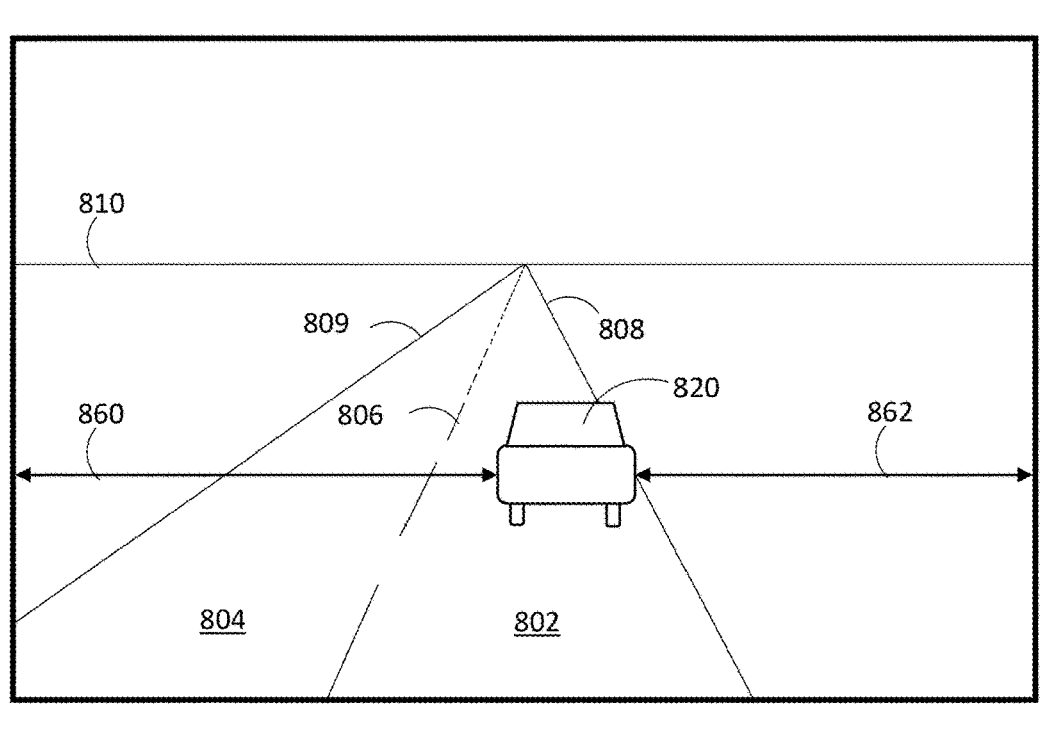
Figure 8C:
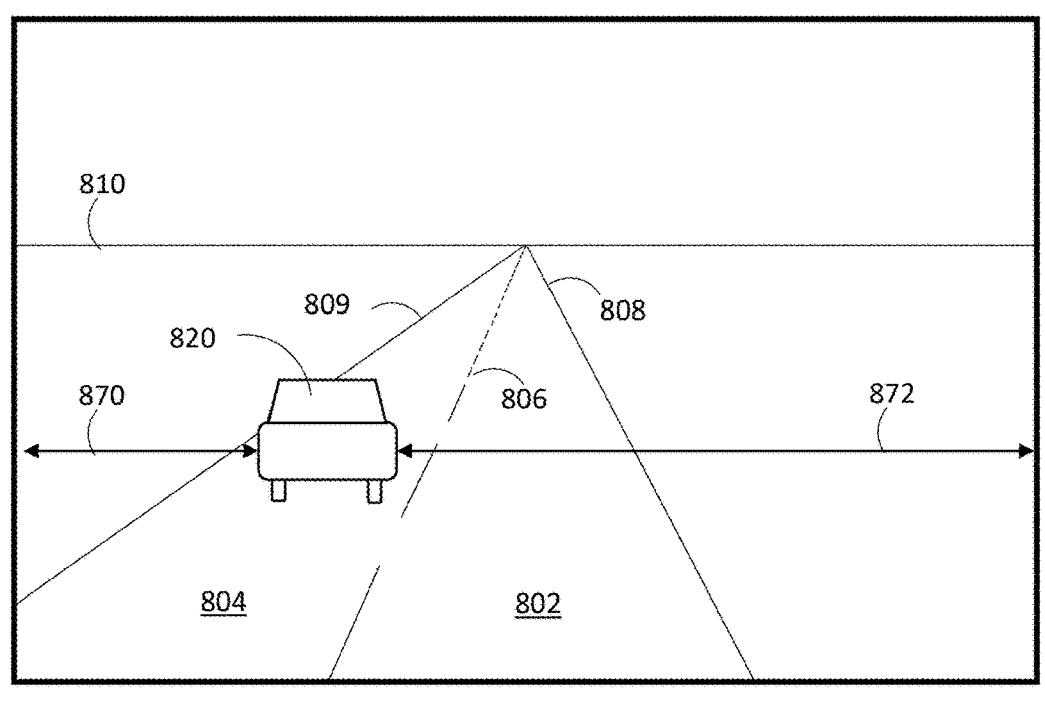

FIGS. 8A, 8B, and 8C each show a vehicle 820 driving along a roadway shown by edges 808 and 809, towards a horizon 810. The roadway has two lanes 802 and 804, separated by dividing line 806. A vehicle is driving behind vehicle 820, and has the image capture device which the perspective of each of images 800A, 800B, and 800C represents.

In accordance with act 504 of method 500, vehicle 820 is identified in images 800A, 800B, and 800C. In FIG. 8A, bounding box 822 is shown around vehicle 820, representing where an object detection model determines vehicle 820 as being. Vehicle 820 can be identified with a similar bounding box in FIGS. 8B and 8C as well, but such a bounding box is not illustrated to reduce clutter.

In one exemplary implementation, a feature detection model is applied to identify road lanes (e.g. based on road edges 808, 809, and dividing line 806). Once lanes are identified, the at least one processor determines a lane of travel of the vehicle carrying the image capture device (in the illustrated example, lane 802). Vehicles travelling in the same lane as the vehicle with the image capture device are considered to be "in front" of the second vehicle (or in a common lane of travel with the second vehicle) in the context of method 500. In this exemplary implementation, vehicle 820 in image 800A and vehicle 820 in image 800B are considered "in front" of the second vehicle, whereas vehicle 820 in image 800C is not considered "in front" of the second vehicle.

In another exemplary implementation, distances from the edges of captured images are used to determine whether the lead vehicle (vehicle 820 in the illustrated example) are travelling "in front" of the second vehicle in the context of method 500.

In this regard, FIG. 8A shows a left-distance 850 representing a distance of vehicle 820 from the left edge of image 800A. Such a left-distance 850 can be determined as a distance from the left edge of bounding box 822 to the left edge of image 800A. Alternatively, such a left-distance 850 can be determined as a distance from a feature on the left side of vehicle 820 to the left edge of image 800A. FIG. 8A also shows a right-distance 852 representing a distance of vehicle 820 from the right edge of image 800A. Such a right-distance 852 can be determined as a distance from the right edge of bounding box 822 to the right edge of image 800A. Alternatively, such a right-distance 852 can be determined as a distance from a feature on the right side of vehicle 820 to the right edge of image 800A. The left-distance and right-distance can be represented, for example, as numbers of pixels in the image data. A difference between the left-distance and the right-distance is determined by the at least one processor (e.g. by subtraction). If the determined distance is within a horizontal distance threshold, the first vehicle (vehicle 820 in the example) is determined as being in front of (or in a common lane of travel with) the second vehicle in method 500.

In the example of FIG. 8A, left-distance 850 and right-distance 852 are nearly identical, such that a difference therebetween is small (and within the horizontal distance threshold). As a result, in the example of FIG. 8A, vehicle 820 is determined as being in front of the second vehicle in method 500.

FIG. 8B shows a left-distance 860 representing a distance of vehicle 820 from the left edge of image 800B, and shows a right-distance 862 representing a distance of vehicle 820 from the right edge of image 800B. In this example, vehicle 820 is positioned further to the right than in FIG. 8A. As a result, left-distance 860 and right distance 862 have some difference. However, this difference is relatively small (representing less than half a road lane), such that the difference is within the horizontal distance threshold. As a result, in the example of FIG. 8B, vehicle 820 is determined as being in front of the second vehicle in method 500.

FIG. 8C shows a left-distance 870 representing a distance of vehicle 820 from the left edge of image 800C, and shows a right-distance 872 representing a distance of vehicle 820 from the right edge of image 800C. In this example, vehicle 820 is positioned further to the left than in FIGS. 8A and 8B. As a result, left-distance 870 and right-distance 872 have a significant difference (representing an entire road lane), such that the difference is outside of the horizontal distance threshold. As a result, in the example of FIG. 8C, vehicle 820 is determined as NOT being in front of the second vehicle in method 500.

In some scenarios, the first vehicle driving in front of a second vehicle does not necessarily result in image data where the first vehicle appears horizontally centered in the image data. For example, a horizontal positioning of an image capture device at the second vehicle results in different perspectives of the first vehicle as represented in captured image data. One way to address this is to install image capture devices to be as close as possible to a horizontal center of vehicles. However, this is not always possible or practical. For example, obstructions may prevent installation of an image capture device near a horizontal center of a vehicle; image capture devices may already be installed away from the horizontal center; or installers may not always install image capture devices in horizontal central location for any number of reasons.

In view of the above, calibration can be performed such that the horizontal distance threshold accounts for non-centered bias of the image data (e.g. due to the image capture device being positioned away from a horizontal center of the second vehicle in the context of method 500 of FIG. 5). This is discussed below with reference to FIGS. 9A and 9B.

Figure 9A:
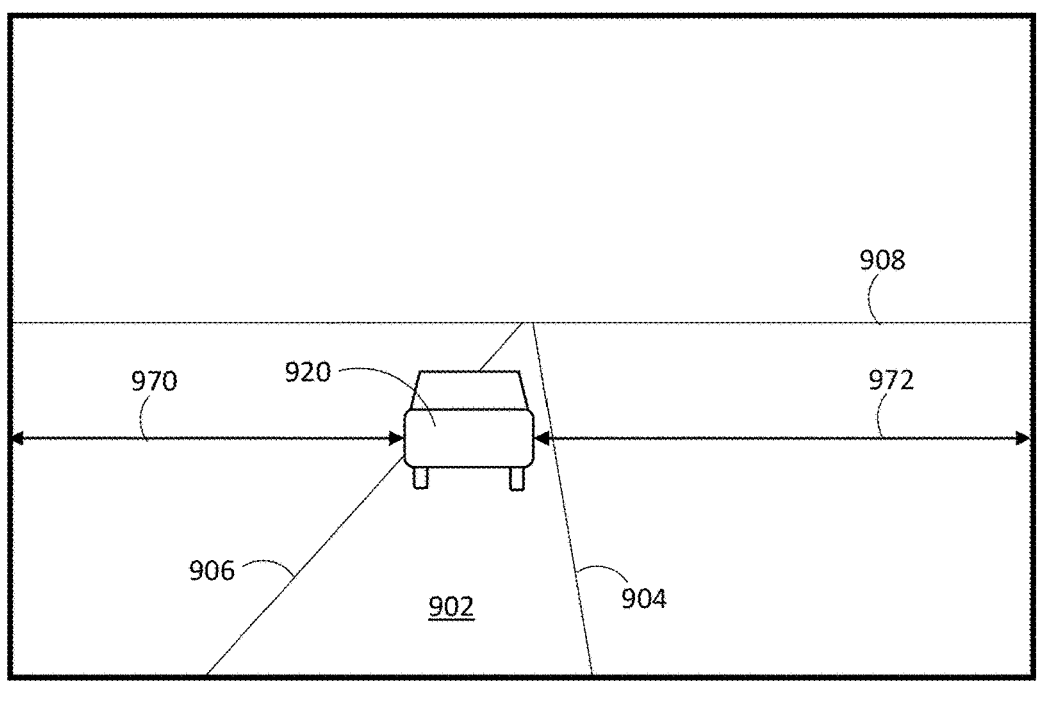
FIGS. 9A and 9B illustrate exemplary images from an image capture device, highlighting horizonal position of a lead vehicle.
Figure 9B:
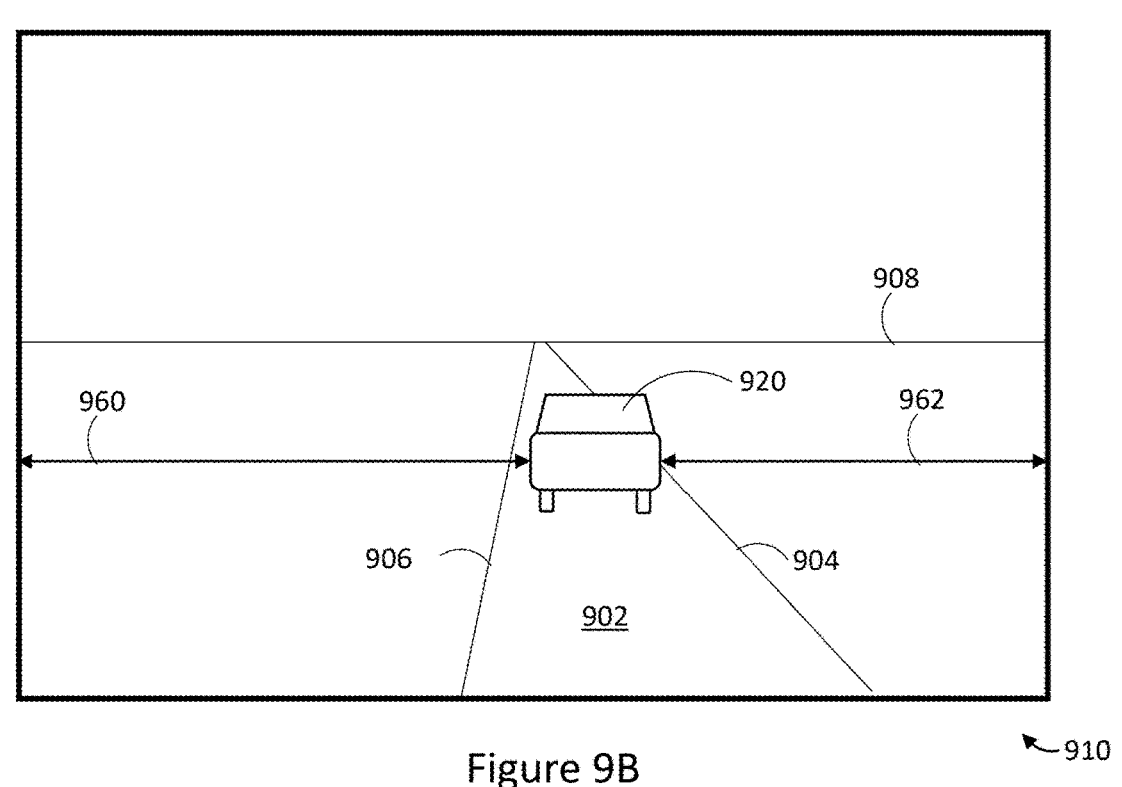

FIGS. 9A and 9B illustrate image data 900 and 910, respectively. FIG. 9A shows an image 900 captured by an image capture device positioned towards the right side of a vehicle (second vehicle). In image 900, vehicle 920 (first vehicle) can be seen, driving on roadway 902 (as bounded by edges 904 and 906), toward horizon 908. FIG. 9B shows an image 910 captured by an image capture device positioned towards the left side of a vehicle (second vehicle). In image 910, vehicle 920 can be seen, driving on roadway 902 (as bounded by edges 904 and 906), toward horizon 908. In image 900, the roadway 902 appears more on the left side, due to the perspective of the corresponding image capture device. In contrast, in image 910 the roadway 902 appears more on the right side due to the perspective of the corresponding image capture device 916.

FIG. 9A also shows a left-distance 970 from the left edge of image data 900, and a right-distance 972 from the right edge of image 900. In the case of FIG. 9A, the second vehicle is travelling behind the first vehicle (vehicle 920), but left-distance 970 is smaller than right-distance 972, due to the perspective of the image capture device which captures image 900. To address this, for determining whether the first vehicle is in front of the second vehicle, the system can be calibrated, such that the horizontal distance threshold represents a value around a difference between left-distance 970 and right-distance 972. For example, an actual "center" which represents horizontal alignment in front of a vehicle in which the image capture device is positioned, which captures image data 900, is a positive value resulting from subtracting left-distance 970 from right-distance 972. In this example, the horizontal distance threshold represents a threshold around said positive value. As another example, an actual "center" which represents horizontal alignment in front of the vehicle in which the image capture device is positioned which captures image data 900 is a negative value resulting from subtracting right-distance 972 from left-distance 970. In this example, the horizontal distance threshold represents a threshold around said negative value.

In the case of FIG. 9B, the second vehicle (the vehicle where the image capture device is positioned) is travelling behind the first vehicle (vehicle 920), but left-distance 960 is larger than right-distance 962, due to the perspective of the image capture device. To address this, for determining whether the first vehicle is in front of the second vehicle, the system can be calibrated, such that the horizontal distance threshold represents a value around a difference between left-distance 960 and right-distance 962. For example, an actual "center" which represents horizontal alignment in front of the vehicle where the image capture device is positioned which captures image data 910 is a negative value resulting from subtracting left-distance 960 from right-distance 962. In this example, the horizontal distance threshold represents a threshold around said negative value. As another example, an actual "center" which represents horizontal alignment in front of the vehicle where the image capture device is positioned which captures image data 910 is a positive value resulting from subtracting right-distance 962 from left-distance 960. In this example, the horizontal distance threshold represents a threshold around said positive value.

Generally, an optimal horizontal distance threshold is determined as appropriate for a specific application or implementation. This is because different camera hardware, different camera positioning, different vehicle features, or any number of other factors can influence optimal horizontal distance threshold.

In some implementations, outputting the indication of a collision (or near-miss) as in act 514 of method 500 comprises outputting an alert to a fleet manager or an operator of a vehicle management system or device. Such an alert serves to inform the operator of an emergency situation, so that appropriate action can be taken. In this regard, FIG. 10 illustrates an exemplary user interface 1000 where a visual alert is displayed indicating the collision situation. Such a visual user interface could comprise any appropriate display, such as display 322 in FIG. 3, or any other display appropriate for a given application. In some implementations, an audio output device can present an audio alert to the operator, such as a statement of the situation, or an alarm sound. In some implementations, multiple forms of alert can be presented in tandem. For example, a visual alert can be displayed as shown in FIG. 10, and an audio alarm can be sounded which prompts the operator to look at the visual alert.

Figure 10:
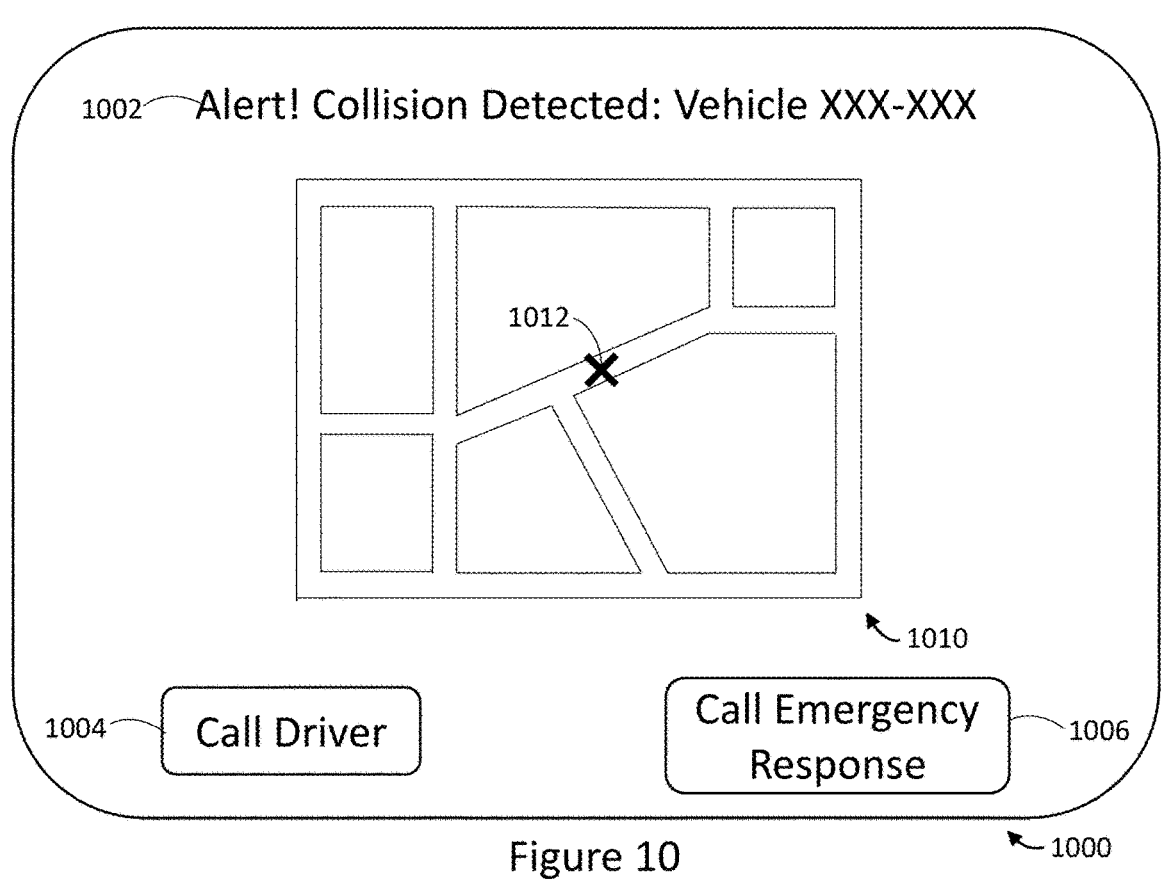
FIG. 10 illustrates a user interface for presenting an indication of a collision, in accordance with at least one exemplary implementation.
Figure 11:
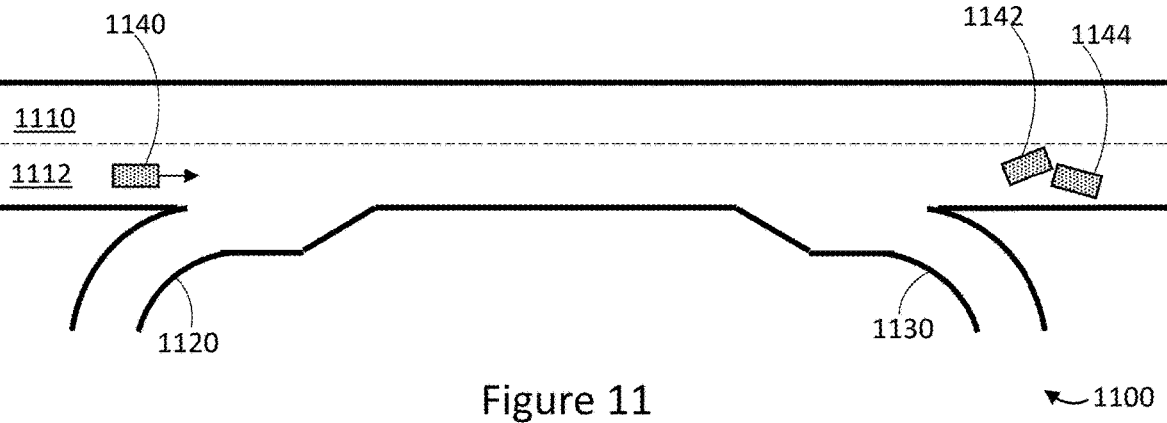
FIG. 11 is a top view of a roadway segment, in accordance with at least one exemplary scenario.

In the example of FIG. 10, user interface 1000 includes an indication 1002 that a collision has occurred, as well as an identification of the vehicle involved in the collision (in this case, vehicle with identifier such as license plate of XXX-XXX). Additionally, user interface 1000 includes a map 1010, which shows a location 1012 of the collision. This can be obtained for example based on location data reported by the telematics device at the vehicle to the fleet management system or device, for the time period of (around or leading up to) the detected collision. User interface 1000 also includes action buttons 1004 and 1006 available to the operator. Button 1004 will initiate a call to the driver of the vehicle (e.g. a call to a cellular telephone of the driver of the vehicle, or a call to a communication device installed in the vehicle). In this way, the operator can confirm that a collision actually occurred and/or that emergency services are actually needed. Button 1006 will initiate communication with emergency response. For example, button 1006 could initiate a call to a government emergency service provider such as ambulance, police, or fire department. The operator can then convey details of the situation to emergency response personnel. In another example, button 1006 may initiate an automated communication or message to emergency personnel with details of the situation. In other examples, a button could be provided which initiates an in-house or private response team to handle the situation (e.g. on-site medical personnel at a remote location).

The specific elements of user interface 1000 shown in FIG. 10 are exemplary, and could be omitted, supplemented, or changed as appropriate for a given application. For example, a simple alert message could be presented to an operator, which can be interacted with (e.g. clicked on) to access or seek more details about the specific vehicle, location, situation, etc.

In some implementations, outputting the indication of a collision as in act 514 of method 500 comprises outputting an alert to other vehicles or drivers approaching a collision location. Such an alert serves to inform the driver of an emergency situation or congestion, so that appropriate action can be taken (e.g. changing route or slowing down). In this regard, FIG. 11 illustrates an exemplary scenario 1100. FIG. 11 shows a roadway having a first lane 1110, a second lane 1112, an on-ramp 1120, and an off-ramp 1130. In the example, first lane 1110 and second lane 1112 are intended for travel in the same direction. In alternative scenarios, any appropriate number of lanes of any appropriate travel directions can be handled. In FIG. 11, vehicle 1140 is traveling in second lane 1112. Vehicles 1142 and 1144 have collided in second lane 1112, ahead of vehicle 1140. Where either or both of vehicles 1142 or 1144 are equipped for collision detection in accordance with method 500 in FIG. 5, the collision shown in FIG. 11 can be detected.

In one example, outputting the indication of a collision as in act 514 of method 500 comprises outputting the indication of the collision to a vehicle management system or device, which in turn provides an alert to pertinent vehicles. In particular, location data reported by the telematics device at vehicle 1142 or 1144 to the fleet management system or device for the time period of (around or leading up to) the detected collision can be used by the management system or device to determine the location of the collision (and optionally a roadway on which the collision occurred). Pertinent other vehicles to which the management system or device can communicate (vehicle 1140 in this example) are identified, for example based on location data from said vehicles which indicates the vehicles are within a certain proximity of the collision or travelling on a roadway where the collision occurred (in a geographic region proximate the position of the vehicles involved in the collision). Once pertinent vehicles are identified, a communication interface of the management device or system transmits an indication or alert of the collision to devices at the pertinent vehicles (e.g. a telematics device or a personal device of a driver of the vehicle).

Figure 12:
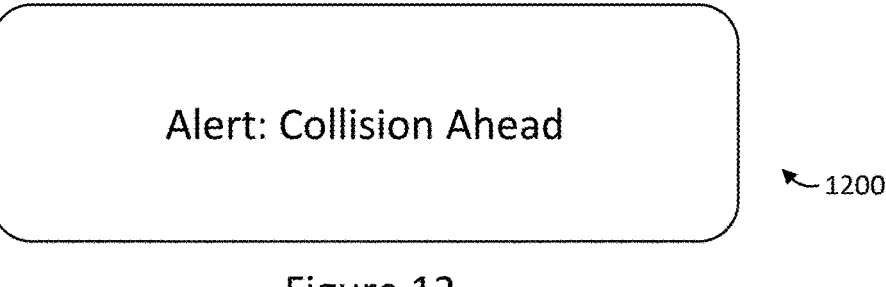
FIG. 12 illustrates a user interface for presenting an indication of a collision of other vehicles, in accordance with at least one exemplary implementation.

FIG. 12 illustrates an exemplary user interface 1200 where a visual alert is displayed indicating the collision situation. Such a visual user interface could comprise any appropriate display, such as display 322 in FIG. 3, or any other display appropriate for a given application. In some implementations, an audio output device can present an audio alert to the operator, such as a statement of the situation, or an alarm sound. In some implementations, multiple forms of alert can be presented in tandem. For example, a visual alert can be displayed as shown in FIG. 12, and an audio alarm can be sounded which prompts the operator to look at the visual alert.

In the example of FIG. 12, user interface 1200 includes an indication that a collision has occurred ahead. In the example of FIG. 11, such an alert is presented at the vehicle 1140, in response to receiving an indication of the collision of vehicles 1142 and 1144 from a management device or server. In response, a driver of vehicle 1140 can change course (e.g. leave the roadway via off-ramp 1130, or change lanes to lane 1110), or can slow down to reduce risk.

In act 512 of method 500 in FIG. 5, the collision detection model (and/or the near-miss detection model) can be a machine learning model. Such a machine learning model can be trained based on labelled training data. For example, image data for scenarios involving collisions, near-misses, or non-collision situations can be obtained (e.g. captured by image capture devices positioned in vehicles, and/or generated by a simulation environment such as CARLA). The data can be analyzed to identify vehicles with bounding boxes, and determine rate of change of at least one spatial parameter of said bounding boxes between images. Determined rates of change can be stored associated with labels indicating whether a collision occurred for the respective images (or whether a near-miss occurred), thereby resulting in a set of labelled training data. The collision detection model (and/or the near-miss detection model) is then iteratively trained based on the training data (e.g. by minimizing a loss function representing a difference between a label for whether a collision occurred, and a prediction confidence by the model that a collision occurred). A specific example of such a training procedure is described below and illustrated in FIG. 13.

Figure 13:
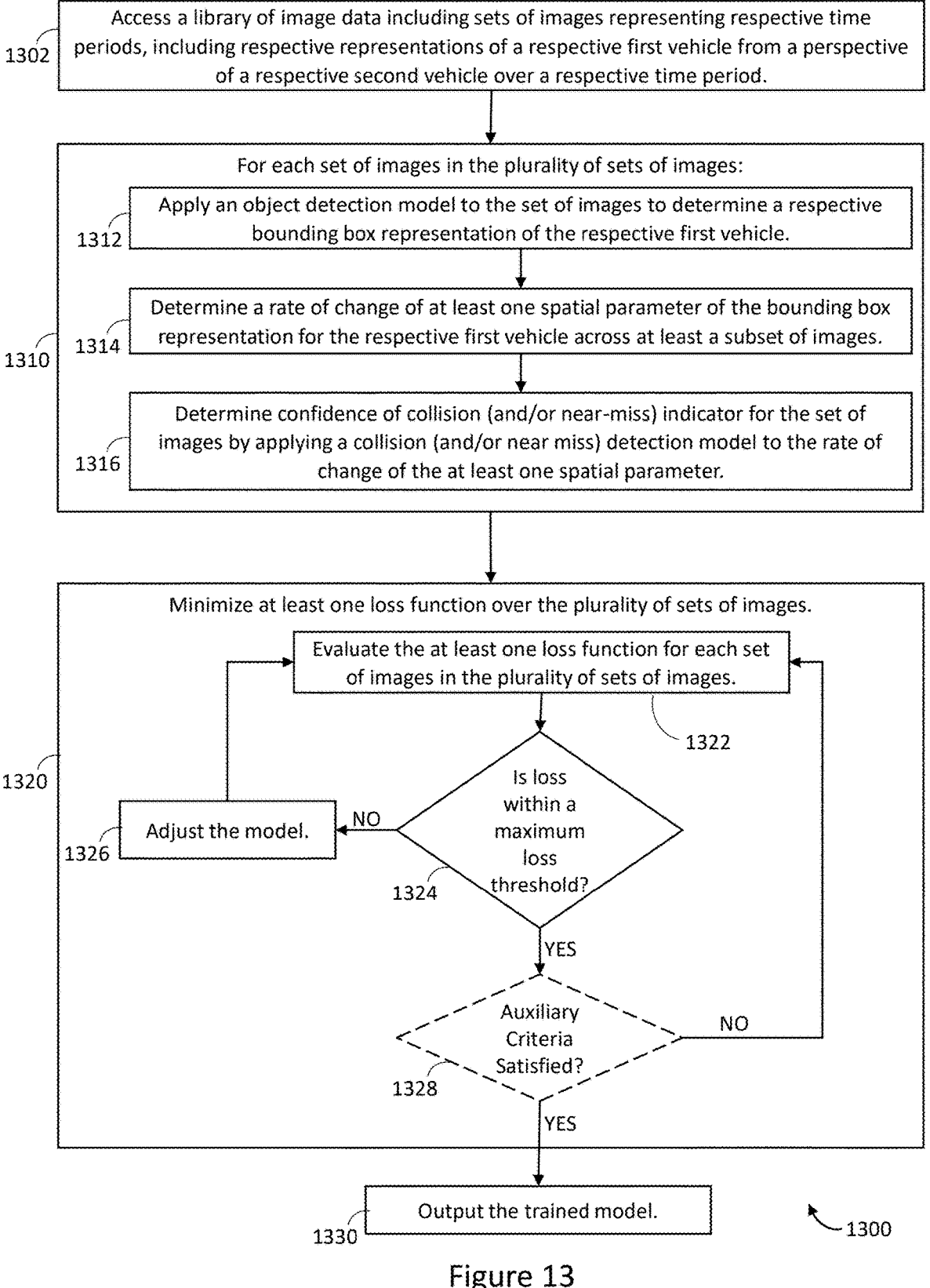
FIG. 13 is a flowchart diagram which illustrates a method for training a collision or near-miss detection model in accordance with at least one exemplary implementation.

FIG. 13 is a flowchart diagram which illustrates an exemplary method 1300 for generating training data and training a collision detection model and/or a near-miss detection model. Method 1300 as illustrated includes acts 1302, 1312, 1314, 1316 (grouped as 1310), 1322, 1324, 1326, 1328 (grouped as 1320), and 1330. One skilled in the art will appreciate that additional acts could be added, acts could be removed, or acts could be reordered as appropriate for a given application. As an example, act 1328 is shown in dashed lines to highlight that this act is optional. Acts of method 1300 can be performed by appropriate components of the systems or devices discussed earlier, similar to as discussed with reference to method 500 in FIG. 5, and not repeated for brevity. Importantly, a system or device which performs method 1300 is not necessarily the same hardware which applies the trained model (e.g. as in method 500 discussed earlier). In this way, training data generation, model training, and model execution can be performed by discrete systems or devices most suited to the task. For example, a central server (e.g. any of client device 104, cloud server 106, or local server 118) can perform training data generation and model training, and a device at a vehicle (e.g. image capture device 108A or peripheral device 220) can apply the model based on image data captured at the vehicle. However, in some implementations, a single device or system can perform all of generating training data, training a machine learning model, and applying the machine learning model.

Reference to "at least one processor" or "a processor" performing acts of any of the methods herein can refer to any appropriate processor. Further, at least one non-transitory processor-readable storage medium can store processor-executable instructions, which when executed by a respective at least one processor cause the corresponding system or device to perform a given act of any of the methods discussed herein.

At 1302, a library of image data is accessed. The library of image data includes sets of images representing respective time periods. At least a plurality of sets of images of the library includes a respective representation of a respective first vehicle from a perspective of a respective second vehicle over the time period for the set of images. Further, each set of images in the plurality of sets of images is associated with a collision label (and/or a near-miss label) indicating whether the respective first vehicle and the respective second vehicle collide (or almost collide in a near-miss) in the respective time period. As an example, images 400, 402, 404, and 406 discussed earlier with reference to FIGS. 4A-4D can represent a set of images for a particular time period. The time period generally corresponds to an event window where an important event happens (or doesn't happen and is intended to train the model not only for affirmative detection, but also to avoid false positive detections). In the example of images 400, 402, 404, and 406, a collision occurs, and thus this set of images in the context of method 1300 is associated with a collision label indicating a collision has occurred. In contrast, the library of image data can include other sets of images where a collision does not occur, to better train the model to distinguish collision scenarios from near-miss scenarios and non-collision scenarios. Such other image sets can be associated with a collision label indicating a collision has not occurred (or a near-miss label indicating a near-miss has occurred). By training a collision detection model based on training data with both collision labels and near-miss labels (or by separately training a collision detection model based on training data with collision labels, and a near-miss detection model based on training data with near-miss labels), a model or set of models is developed which can identify and differentiate between collisions, near-misses, and no-collision no-near-miss scenarios.

In some implementations, the plurality of sets of images includes only sets of images where the respective first vehicle and second vehicle are positioned in a common lane of travel. That is, the image data can be pre-sorted or filtered prior to method 1300, such that the plurality of sets of images are specifically limited to sets of images where the respective first vehicle and second vehicle are positioned in a common lane of travel. For example, prior to method 1300 a lane delineation model could be run on the library of image data, to identify sets of images where the respective first vehicle and second vehicle are positioned in a common lane of travel.

In other implementations, method 1300 itself can include identifying sets of images where the respective first vehicle and second vehicle are positioned in a common lane of travel. In particular, the at least one processor of the system or device which performs method 1300 can, for each set of images in the library, determine whether the set of images includes a representation of the respective first vehicle from the perspective of the second vehicle, where the respective first vehicle and the respective second vehicle are positioned in a respective common lane of travel (e.g. by executing a lane detecting model and determining relative positioning of the first vehicle and the second vehicle, or other means such as those discussed with reference to FIGS. 8A, 8B, 8C, 9A and 9B). If the set of images includes the representation of the respective first vehicle from the position of the respective second vehicle, with the respective first vehicle and the respective second vehicle positioned in the respective common lane of travel, then the set of images is included in the plurality of sets of images which are used to train the collision or near-miss detection model. If the set of images does not include the representation of the respective first vehicle from the position of the respective second vehicle, with the respective first vehicle and the respective second vehicle positioned in the respective common lane of travel, then the set of images is excluded from the plurality of sets of images which are used to train the collision or near-miss detection model.

In some implementations, the library of image data includes image data which is captured by an image capture device (such as image capture device 108A or 108B discussed with reference to FIGS. 2A and 2B), and stored by an appropriate non-transitory processor-readable storage medium (e.g. medium 212 in FIGS. 2A and 2B). In some implementations the library of image data includes image data generated by a simulation tool, such as CARLA. Accessing the image data at 1302 can comprise capturing the image data by at least one image captured device, generating the image data by simulation, and/or retrieving the image data (as previously captured or simulated) from at least one non-transitory processor-readable storage medium (e.g. of the device performing method 1300, or a remote server).

Grouped as 1310, acts 1312, 1314, and 1316 are performed for each set of images in the plurality of sets of images. At 1312, at least one processor applies an object detection model to the set of images to determine a respective bounding box representation of the respective first vehicle. At 1314, the at least one processor determines a rate of change of at least one spatial parameter of the bounding box representation for the respective first vehicle across at least a subset of images. Determination of a bounding box as in 1312 and determination of a rate of change as in 1314 are performed similarly to as discussed earlier with reference to FIGS. 4A-4D and 5; this discussion is not repeated for brevity.

At 1316, the collision detection model being trained is applied by the at least one processor to the rate of change determined at 1314 for the set of images, to determine a confidence of collision indicator (and/or a confidence of near-miss indicator) for the set of images. The confidence of collision indicator could be, for example, a percentage, fraction, or decimal representing the likelihood of collision, as determined by the model. Likewise, the confidence of near-miss indicator could be, for example, a percentage, fraction, or decimal representing the likelihood of a near-miss, as determined by the model.

Grouped as 1320, acts 1322, 1324, 1326, and/or 1328 are performed for each set of images in the plurality of sets of images, to minimize at least one loss function. At 1322, the at least one loss function is evaluated by the at least one processor for each set of images in the plurality of images. The loss function can include, for example, a difference between a collision label associated with the set of images (e.g. a 1 for collision, or a 0 for no collision) and a confidence of collision indicator as determined at 1316 for the set of images (e.g. a decimal between 0 and 1). The loss function could also include, for example, a difference between a near-miss label associated with the set of images (e.g. a 1 for near-miss, or a 0 for no near-miss) and a confidence of near miss indicator as determined at 1316 for the set of images (e.g. a decimal between 0 and 1). As another example, the loss function could also include a sum of: difference between a near-miss label associated with the set of images and a confidence of near miss indicator as determined at 1316, and difference between a collision label associated with the set of images and a confidence of collision indicator as determined at 1316, for the set of images. A loss function which account for both collisions and near-misses can be referred to as a "combined collision and near-miss detection model" or a "combined near-miss and collision detection model".

In this example, the smaller the results of the at least one loss function, the more accurately the model being trained predicted collision, near-miss, or no collision (no near-miss).

At 1324, the at least one processor determines whether the determined loss at 1322 is within a maximum loss threshold. Where more than one loss function is evaluated (e.g. a separate collision loss function and near-miss loss function), act 1324 could be performed in different manners. As one example, the at least one processor can determine whether all of the determined losses at 1322 are within respective maximum loss thresholds. As another example, the at least one processor can determine whether an average (optionally weighted) of the determined losses at 1322 is within a maximum loss threshold.

If the loss is not within the maximum loss threshold (the maximum loss threshold is exceeded), the collision and/or near miss detection model is not yet accurate enough, and method 1300 proceeds to act 1326 where the model or models is adjusted (e.g. by adjusting weights or model parameters for the respective model). The method then returns to act 1322, where the at least one loss function is evaluated again. In some implementations, the at least one loss function is evaluated for the same set of images, to refine the model until loss is within the maximum loss threshold for the set of images. In other implementations, the at least one loss function is evaluated for a different set of images in the plurality of sets of images.

Acts 1322, 1324, and 1326 can be iterated any appropriate number of times, until loss is within the maximum loss threshold at 1324, in which case method 1300 proceeds to 1328. At 1328, auxiliary criteria for the model are evaluated. If the auxiliary criteria are not satisfied, method 1300 returns to act 1322, where the at least one loss function is evaluated. Auxiliary criteria can include various criteria. As one example, auxiliary criteria can require that the at least one loss function be within a maximum loss threshold for each set of images in the plurality of sets of image data. That is, even if loss is within a maximum loss threshold for a first set of images, the auxiliary criteria can require that each set of images be evaluated prior to outputting the trained model.

As another example, auxiliary criteria can require that loss be within a maximum loss threshold for at least a defined amount of sets of images in the plurality of sets of image data. That is, even if loss is within a maximum loss threshold for a first set of images, the auxiliary criteria can require that loss be within the maximum loss threshold for a defined amount (e.g. 90%) of the sets of images in the plurality of sets of image data. As another example, auxiliary criteria can require that the at least one loss function be evaluated for at least a defined amount of sets of images (e.g. 90%) in the plurality of sets of image data.

Act 1328 is optional. In one exemplary implementation, evaluating the at least one loss function for at least one set of images in act 1322 comprises evaluating the at least one loss function for each set of images (or for a defined amount of images in the first set of images), such that criteria regarding quantity of image sets to be evaluated are inherently satisfied.

If the auxiliary criteria are satisfied at 1328 (or if act 1328 is not included), method 1300 proceeds to act 1330. At 1330, the model is considered as a "trained" model, and is output for use. For example, the trained model can be sent to another device for storage, distribution, and/or application, or can be stored at a non-transitory processor-readable storage of the device which performed the training.

While the present invention has been described with respect to the non-limiting embodiments, it is to be understood that the invention is not limited to the disclosed embodiments. Persons skilled in the art understand that the disclosed invention is intended to cover various modifications and equivalent arrangements included within the scope of the appended claims. Thus, the present invention should not be limited by any of the described embodiments.

Throughout this specification and the appended claims, infinitive verb forms are often used, such as "to operate" or "to couple". Unless context dictates otherwise, such infinitive verb forms are used in an open and inclusive manner, such as "to at least operate" or "to at least couple".

The Drawings are not necessarily to scale and may be illustrated by phantom lines, diagrammatic representations, and fragmentary views. In certain instances, details that are not necessary for an understanding of the exemplary embodiments or that render other details difficult to perceive may have been omitted.

The specification includes various implementations in the form of block diagrams, schematics, and flowcharts. A person of skill in the art will appreciate that any function or operation within such block diagrams, schematics, and flowcharts can be implemented by a wide range of hardware, software, firmware, or combination thereof. As non-limiting examples, the various embodiments herein can be implemented in one or more of: application-specific integrated circuits (ASICs), standard integrated circuits (ICs), programmable logic devices (PLDs), field-programmable gate arrays (FPGAs), computer programs executed by any number of computers or processors, programs executed by one or more control units or processor units, firmware, or any combination thereof.

The disclosure includes descriptions of several processors. Said processors can be implemented as any hardware capable of processing data, such as application-specific integrated circuits (ASICs), standard integrated circuits (ICs), programmable logic devices (PLDs), field-programmable gate arrays (FPGAs), logic circuits, or any other appropriate hardware. The disclosure also includes descriptions of several non-transitory processor-readable storage mediums. Said non-transitory processor-readable storage mediums can be implemented as any hardware capable of storing data, such as magnetic drives, flash drives, RAM, or any other appropriate data storage hardware. Further, mention of data or information being stored at a device generally refers to the data information being stored at a non-transitory processor-readable storage medium of said device.

What is claimed is:

1. A method for identifying a collision between a first vehicle and second vehicle comprising:

accessing image data, the image data including a set of images, each image of the set of images captured by an image capture device positioned at the second vehicle;

applying, by at least one processor, an object detection model to each image in the set of images to determine a respective bounding box representation of the first vehicle from the perspective of the second vehicle for each image;

determining, by the at least one processor, for each image of the set of images, that the first vehicle and the second vehicle are positioned in a respective common lane of travel;

in response to determining that the first vehicle and the second vehicle are positioned in the respective common lane of travel:

determining, by the at least one processor, a rate of change of at least one spatial parameter of the bounding box for the first vehicle across at least a subset of the set of images, wherein the at least one spatial parameter is indicative of a size of the bounding box;

applying, by the at least one processor, a collision detection model to identify a collision between the first vehicle and the second vehicle based on the rate of change of the at least one spatial parameter of the bounding box; and outputting an indication of collision when the collision detection model identifies a collision between the first vehicle and the second vehicle.

2. The method of claim 1, wherein if applying the object detection model to each image in the set of images to determine a respective bounding box representation of the first vehicle from the perspective of the second vehicle for each image does not result in a determination of any bounding boxes: identify no collision between the first vehicle and the second vehicle.

3. The method of claim 1, wherein accessing the image data comprises capturing the image data by the at least one image capture device positioned at the second vehicle.

4. The method of claim 1, wherein accessing the image data comprises retrieving the image data stored at a non-transitory processor-readable storage medium.

5. The method of claim 1, wherein the at least one processor is positioned at the second vehicle, and outputting an indication of collision comprises transmitting the indication of collision by a communication interface to be received by a device remote from the second vehicle.

6. The method of claim 5, further comprising outputting an alert to an operator of the device remote from the second vehicle.

7. The method of claim 5, further comprising transmitting, by a communication interface of the device remote from the second vehicle, the indication of collision to at least one other vehicle in a geographic region proximate a position of the second vehicle.

8. A system for identifying a collision between a first vehicle and second vehicle comprising:

at least one processor;

at least one non-transitory processor-readable storage medium storing processor-executable instructions which when executed cause the system to:

access image data, the image data including a set of images, each image of the set of images captured by an image capture device positioned at the second vehicle;

apply, by the at least one processor, an object detection model to each image in the set of images to determine a respective bounding box representation of the first vehicle from the perspective of the second vehicle for each image;

determine, by the at least one processor, for each image of the set of images, whether the first vehicle and the second vehicle are positioned in a respective common lane of travel;

when the first vehicle and the second vehicle are positioned in the respective common lane of travel:

determine, by the at least one processor, a rate of change of at least one spatial parameter of the bounding box for the first vehicle across at least a subset of the set of images, wherein the at least one spatial parameter is indicative of a size of the bounding box;

apply, by the at least one processor, a collision detection model to identify a collision between the first vehicle and the second vehicle based on the rate of change of the at least one spatial parameter of the bounding box; and output an indication of collision when the collision detection model identifies a collision between the first vehicle and the second vehicle; and when the first vehicle and the second vehicle are not positioned in the respective common lane of travel:

determine, by the at least one processor that there is no collision between the first vehicle and the second vehicle.

9. The system of claim 8, wherein if the processor-executable instructions which cause the system to apply the object detection model to each image in the set of images to determine a respective bounding box representation of the first vehicle from the perspective of the second vehicle for each image does not result in a determination of any bounding boxes: the processor-executable instructions cause the system to identify no collision between the first vehicle and the second vehicle.

10. The system of claim 8, further comprising the at least one image capture device positioned at the second vehicle, wherein the processor-executable instructions which cause the system to access the image data cause the system to capture the image data by the at least one image capture device positioned at the second vehicle.

11. The system of claim 10, wherein the system includes a telematic device positioned at the second vehicle, and the at least one processor and the at least one non-transitory processor-readable storage medium are included in the telematic device.

12. The system of claim 8, wherein the processor executable instructions which cause the system to access the image data cause the system to retrieve the image data stored at the non-transitory processor-readable storage medium.

13. The system of claim 8, further comprising a communication interface at the second vehicle, wherein the at least one processor is positioned at the second vehicle, and the processor-executable instructions which cause the system to output an indication of collision cause the communication interface at the second vehicle to transmit the indication of collision to be received by a device remote from the second vehicle.

14. The system of claim 13, further comprising the device remote from the second vehicle, wherein the processor-executable instructions further cause the system to output, by an output interface of the device remote from the second vehicle, an alert to an operator of the device remote from the second vehicle.

15. The system of claim 13 further comprising the device remote from the second vehicle, wherein the processor-executable instructions further cause the system to transmit, by a communication interface of the device remote from the second vehicle, the indication of collision to at least one other vehicle in a geographic region proximate a position of the second vehicle.

16. The method of claim 1, wherein determining that the first vehicle and the second vehicle are positioned in a respective common lane of travel comprises:

applying a feature detection model to identify road lanes;
identifying a lane of travel of the of the second vehicle; and
determining that the first vehicle is in the lane of travel of the second vehicle.

17. The method of claim 1, wherein determining that the first vehicle and the second vehicle are positioned in a respective common lane of travel comprises:

determining a left-distance from a left image edge and a right-distance from a right image edge for a representation of the first vehicle in the image of the set of images; and
determining that the first vehicle and the second vehicle are in a common lane of travel in response to a difference between the left-distance and the right-distance being within a horizontal distance threshold.

18. The system of claim 8, wherein the processor executable instructions which cause the at least one processor to determine whether the first vehicle and the second vehicle are positioned in a respective common lane of travel cause the at least one processor to:

apply a feature detection model to identify road lanes;
identify a lane of travel of the of the second vehicle; and
determine whether the first vehicle is in the lane of travel of the second vehicle.

19. The system of claim 8, wherein the processor-executable instructions which cause the at least one processor to determine whether the first vehicle and the second vehicle are positioned in a respective common lane of travel cause the at least one processor to:

determine a left-distance from a left image edge and a right-distance from a right image edge for a representation of the first vehicle in the image of the set of images; and
determine that the first vehicle and the second vehicle are in a common lane of travel if a difference between the left-distance and the right-distance are within a horizontal distance threshold.

20. The method of claim 1, wherein the collision detection model determines a confidence score indicative of a likelihood that a collision has occurred between the first vehicle and the second vehicle, and wherein outputting the indication of collision comprises outputting the indication of collision when the collision detection model determines the confidence score which satisfies a confidence threshold.

21. The system of claim 8, wherein the collision detection model determines a confidence score indicative of a likelihood that a collision has occurred between the first vehicle and the second vehicle, and wherein the processor-executable instructions which cause the system to output the indication of collision cause the system to output the indication of collision when the collision detection model determines the confidence score which satisfies a confidence threshold.

* * * * *